United States Patent
Gysling et al.

(10) Patent No.: US 7,197,938 B2
(45) Date of Patent: Apr. 3, 2007

(54) CONTACT-BASED TRANSDUCERS FOR CHARACTERIZING UNSTEADY PRESSURES IN PIPES

(75) Inventors: Daniel L. Gysling, Glastonbury, CT (US); Thomas W. Engel, East Hampton, CT (US); Robert J. Maron, Middletown, CT (US); Paul F. Croteau, Columbia, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 10/975,745

(22) Filed: Oct. 27, 2004

(65) Prior Publication Data

US 2005/0120799 A1 Jun. 9, 2005

Related U.S. Application Data

(63) Continuation-in-part of application No. 10/876,013, filed on Jun. 24, 2004, now abandoned.

(60) Provisional application No. 60/482,465, filed on Jun. 24, 2003, provisional application No. 60/482,515, filed on Jun. 24, 2003.

(51) Int. Cl.
G01L 9/00 (2006.01)
(52) U.S. Cl. .................. 73/753; 73/861.42; 73/756
(58) Field of Classification Search .......... 73/700–756, 73/861.42–861.49; 361/283.1–283.4
See application file for complete search history.

(56) References Cited

U.S. PATENT DOCUMENTS 4,048,853 A 9/1977 Smith et al. ............. 73/861.25

(Continued)

FOREIGN PATENT DOCUMENTS

GB 2345546 7/2000

(Continued)

OTHER PUBLICATIONS

"Noise and Vibration Control Engineering Principles and Applications", Leo L. Beranek and Istvan L. Ver, A. Wiley Interscience Publication, pp. 537-541, Aug. 1992.

(Continued)

*Primary Examiner*—Edward Lefkowitz
*Assistant Examiner*—Jermaine Jenkins
(74) *Attorney, Agent, or Firm*—Robert D. Crawford, Esq.

(57) ABSTRACT

A sensor head characterizes unsteady pressures in a fluid flowing within a pipe, as may be caused by one or both of acoustic waves propagating through the fluid within the pipe and/or pressure disturbances that convect with the fluid flowing in the pipe. The sensor head comprises a rigid support structure and at least one transducer attached to the rigid support structure. The rigid support structure holds the transducer in contact with an outer surface of the pipe. The at least one transducer senses relative movement between the outer surface of the pipe and the support structure and provides a signal indicative of unsteady pressures within the fluid at a corresponding axial position of the pipe in response to the relative movement. The support structure may be attached to each transducer in an array of transducers, and may include a handle secured thereto for manipulating the sensor head into contact with the pipe. Output signals from the transducers are provided to a processing unit, which processes the output signals to provide a signal indicative of at least one parameter of the flow process.

48 Claims, 15 Drawing Sheets

U.S. PATENT DOCUMENTS

| | | | |
|---|---|---|---|
| 4,080,837 A | 3/1978 | Alexander et al. | 73/61.45 |
| 4,248,085 A | 2/1981 | Coulthard | 73/861.06 |
| 4,445,389 A | 5/1984 | Potzick et al. | 73/861.27 |
| 4,896,540 A | 1/1990 | Shakkottai et al. | 73/861.02 |
| 5,040,415 A | 8/1991 | Barkhoudarian | 73/861.03 |
| 5,083,452 A | 1/1992 | Hope | 73/61 R |
| 5,218,197 A | 6/1993 | Carroll | 250/227.19 |
| 5,285,675 A | 2/1994 | Colgate et al. | 73/23.2 |
| 5,367,911 A | 11/1994 | Jewell et al. | 73/861.08 |
| 5,398,542 A | 3/1995 | Vasbinder | 73/40.5 |
| 5,524,475 A | 6/1996 | Kolpak et al. | 73/19.03 |
| 5,526,844 A | 6/1996 | Kamen et al. | 137/614.11 |
| 5,591,922 A | 1/1997 | Segeral et al. | 73/861.04 |
| 5,741,980 A | 4/1998 | Hill et al. | 73/861.04 |
| 5,770,805 A | 6/1998 | Castel | 73/861.04 |
| 5,770,806 A | 6/1998 | Hiismaki | 73/861.29 |
| 5,835,884 A | 11/1998 | Brown | 73/861.04 |
| 5,845,033 A | 12/1998 | Berthold et al. | 385/12 |
| 5,948,959 A | 9/1999 | Peloquin | 73/1.83 |
| 6,151,958 A | 11/2000 | Letton et al. | 73/61.79 |
| 6,202,494 B1 | 3/2001 | Ricbel et al. | 73/861.29 |
| 6,309,354 B1 * | 10/2001 | Madsen et al. | 600/438 |
| 6,354,147 B1 | 3/2002 | Gysling et al. | 73/61.79 |
| 6,378,357 B1 | 4/2002 | Han et al. | 73/54.41 |
| 6,435,030 B1 | 8/2002 | Gysling et al. | 73/587 |
| 6,463,813 B1 | 10/2002 | Gysling | 73/862.59 |
| 6,536,291 B1 | 3/2003 | Gysling et al. | 73/861.42 |
| 6,550,342 B2 | 4/2003 | Croteau et al. | 73/800 |
| 6,587,798 B2 | 7/2003 | Kersey et al. | 702/50 |
| 6,601,458 B1 | 8/2003 | Gysling et al. | 73/861.04 |
| 6,609,069 B2 | 8/2003 | Gysling | 702/48 |
| 6,691,584 B2 | 2/2004 | Gysling et al. | 73/861.42 |
| 6,732,575 B2 | 5/2004 | Gysling et al. | 73/61.79 |
| 6,782,150 B2 | 8/2004 | Davis et al. | 385/12 |
| 6,813,962 B2 | 11/2004 | Gysling et al. | 73/861.26 |
| 6,837,098 B2 | 1/2005 | Gysling et al. | 73/61.79 |
| 6,868,737 B2 | 3/2005 | Croteau et al. | |
| 6,889,556 B2 * | 5/2005 | Steger | 73/756 |
| 6,889,562 B2 | 5/2005 | Gysling et al. | |
| 6,898,541 B2 | 5/2005 | Gysling et al. | |
| 6,971,259 B2 | 12/2005 | Gysling | |
| 7,032,432 B2 | 4/2006 | Gysling et al. | |
| 2003/0136186 A1 | 7/2003 | Gysling et al. | |
| 2003/0154036 A1 | 8/2003 | Gysling et al. | |
| 2004/0069069 A1 | 4/2004 | Croteau | |
| 2004/0168523 A1 | 9/2004 | Bailey et al. | |
| 2004/0199340 A1 | 10/2004 | Gysling et al. | |
| 2004/0210404 A1 | 10/2004 | Gysling et al. | |
| 2004/0226386 A1 | 11/2004 | Croteau et al. | |
| 2004/0231431 A1 | 11/2004 | Bailey et al. | |
| 2004/0255695 A1 | 12/2004 | Gysling et al. | |
| 2005/0011283 A1 | 1/2005 | Gysling et al. | |
| 2005/0012935 A1 | 1/2005 | Kersey | |
| 2005/0044966 A1 | 3/2005 | Croteau et al. | |
| 2005/0227538 A1 | 10/2005 | Engel | |

FOREIGN PATENT DOCUMENTS

| | | |
|---|---|---|
| WO | WO 93/14382 | 7/1993 |
| WO | WO 99/067629 | 12/1999 |

OTHER PUBLICATIONS

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag.

"Viscous Attenuation of Acoustic Waves in Suspensions" by R.L. Gibson, Jr. and M.N. Toksoz, May 1989.

* cited by examiner

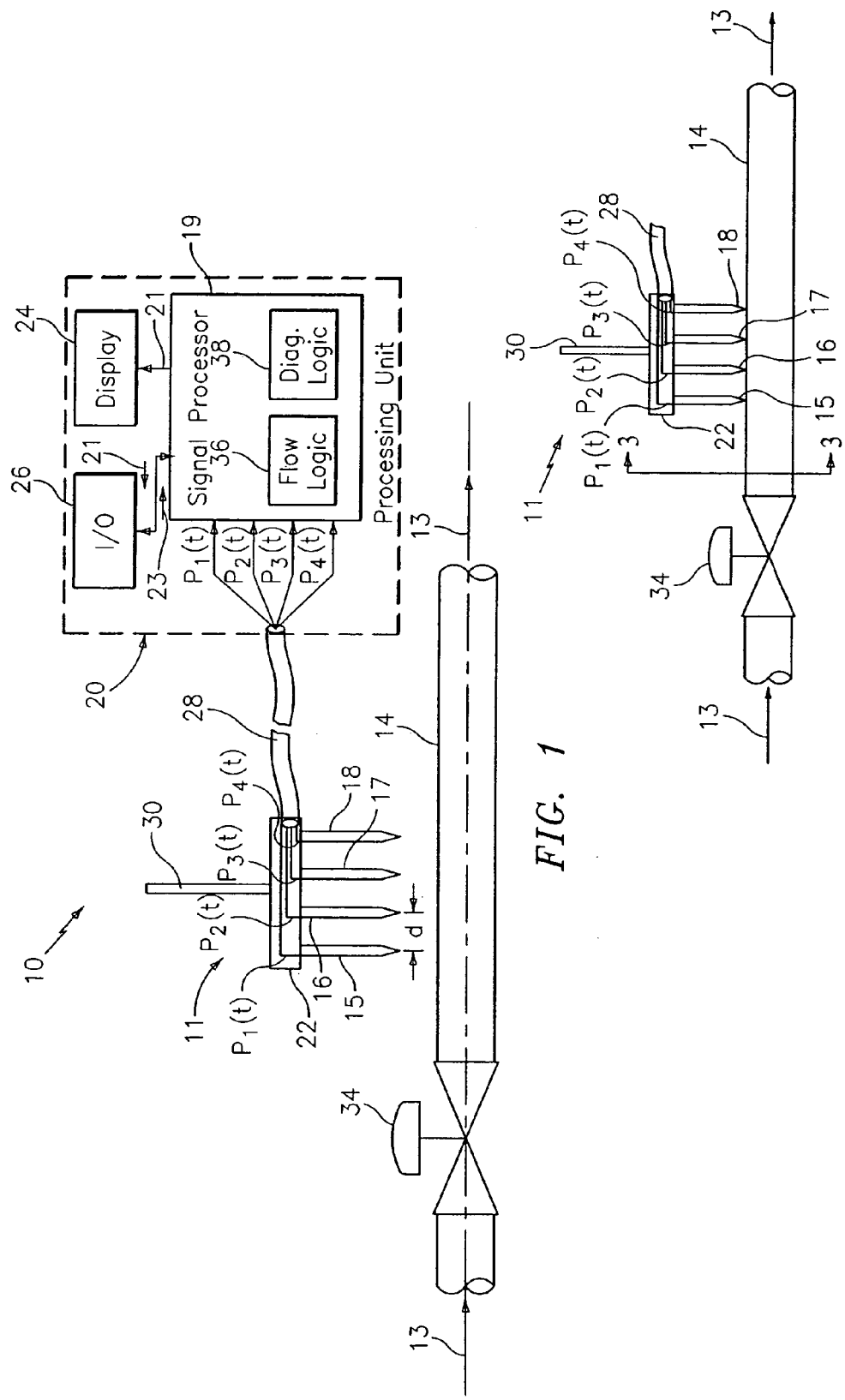

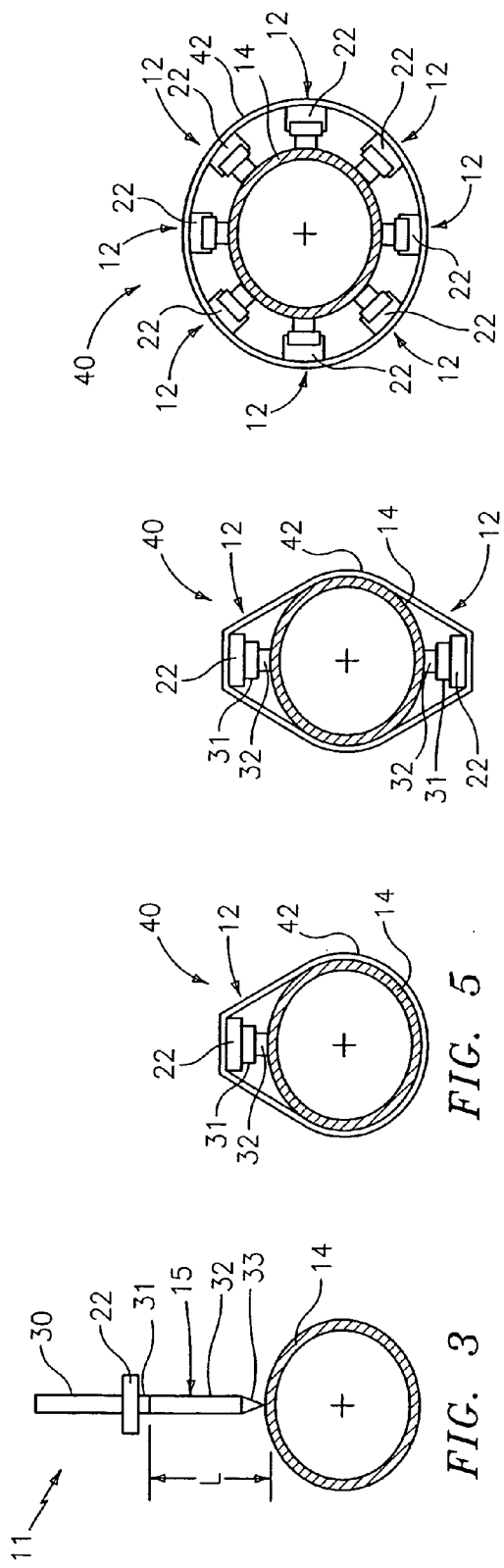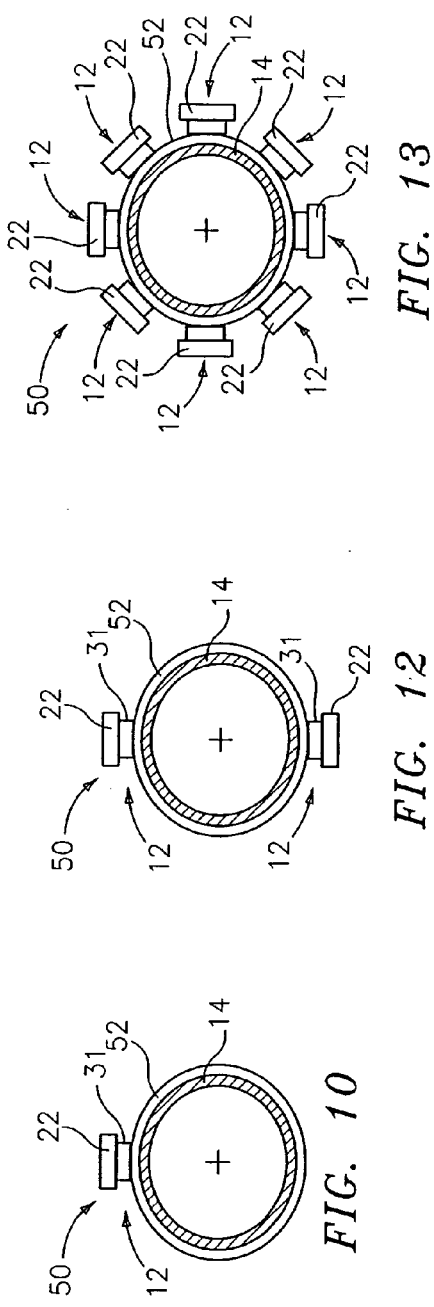

CONTACT-BASED TRANSDUCERS FOR CHARACTERIZING UNSTEADY PRESSURES IN PIPES

CROSS-REFERENCE TO RELATED PATENT APPLICATIONS

This application is a continuation-in-part of U.S. patent application Ser. No. 10/876,013, filed Jun. 24, 2004 now abandoned, which claims the benefit of U.S. Provisional Patent Application No. 60/482,465, filed Jun. 24, 2003, and U.S. Provisional Patent Application No. 60/482,515, filed Jun. 24, 2003, all of which are incorporated by reference herein in their entirety.

TECHNICAL FIELD

This invention relates to an apparatus for characterizing unsteady pressures in a fluid flowing within a pipe, and more particularly to an apparatus having an array of contact-based transducers for characterizing unsteady pressures in the fluid to determine parameters of the flow process, such as volumetric flow rate, composition, velocity, mass flow rate, density and particle size of the fluid and health of a diagnosed component of the flow process.

BACKGROUND

A fluid flow process (flow process) includes any process that involves the flow of fluid through pipes, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

Various sensing technologies exist for measuring various physical parameters of single and/or multiphase fluids in an industrial flow process. Such physical parameters include, for example, volumetric flow rate, composition, consistency, density, and mass flow rate.

In certain sensing applications, such as in industrial flow processes, it may be desirable to sense these parameters at different times and at different locations throughout the industrial flow process. For example, it may be desirable to periodically and temporarily sense volumetric flow at various locations to check the health and performance of the flow process. It may also be desirable to periodically validate the output of various meters throughout the flow process. Such requirements give rise to the need for a sensing device that is easily attached to the pipe and is portable from one location to another. Problematically, many sensors must be placed in contact with the fluid and, as a result, cannot be installed without shutting down a portion of the flow process to install the sensors.

Various non-intrusive sensors have been developed, which are attached to the surface of the pipe. Such sensors include, for example, the ultrasonic transmitter and receiver found in ultrasonic flow meters. While ultrasonic flow meters perform well for certain applications, they are generally limited to use with certain types of fluids. Moreover, precise alignment of the ultrasonic transmitter and receiver pair is required, which may not lend itself to instrument portability and adaptability to different pipe sizes.

Thus, there remains a need for a sensor for measuring various parameters of single and/or multiphase fluids in an industrial flow process that is easily attached to the pipe and which may be portable from one location to another.

SUMMARY OF THE INVENTION

The above-described and other needs are met by a sensor head for characterizing unsteady pressures in a fluid flowing within a pipe. The sensor head comprises a first support structure and at least one transducer in a first array of transducers attached to the first support structure. The at least one transducer senses relative movement between an external surface of the pipe and the first support structure and provides a signal indicative of unsteady pressures within the fluid at a corresponding axial position of the pipe in response to the relative movement.

In various embodiments, the at least one transducer is disposed between the first support structure and the outer surface of the pipe. The first support structure may be attached to each transducer in the first array of transducers, and the first support structure may be secured to the pipe with at least one strap.

The first support structure may include a handle secured thereto for allowing field personnel to manipulate the sensor head into contact with the pipe. Each of the transducers in the first array of transducers may include a transducer element attached to the first support structure and a standoff probe attached to the transducer element. The standoff probe may have a pipe contacting tip on its distal end. The overall length of the standoff probe may be selected to protect the transducer element from a potentially harmful condition proximate the pipe. The pipe contacting tip may be configured to penetrate a material surrounding the pipe to come into contact with the pipe. The transducer elements may be selected from one or more of: piezoelectric devices, optical devices, capacitive devices, resistive devices, accelerometers, velocity measuring devices, displacement measuring devices, inductance and reluctance measuring devices, and magnetostrictive devices.

In various embodiments of the invention, the support structure is a strap disposed around the pipe and the at least one transducer. The strap may be anchored to the pipe. A second array of transducers may be included in the sensor head, with each transducer in the second array being associated with a corresponding one of the transducers in the first array a common axial position of the pipe. The associated transducers in the first and second arrays provide signals indicative of unsteady pressures within the pipe at the common axial position. The signals output by the associated transducers in the first and second arrays may be summed to provide a summed signal indicative of unsteady pressures within the pipe at the common axial position. The at least one transducer may include an accelerometer.

In other embodiments of the invention, the sensor head further includes a second support structure and a second array of transducers attached to the second support structure. Each of the transducers in the second array of transducers is associated with a corresponding one of the transducers in the first array of transducers at a common axial position of the pipe. The associated transducers in the first and second arrays provide signals indicative of unsteady pressures within the pipe at the common axial position. The first and second support structures may be secured to the pipe with at least one strap. The signals output by the associated transducers may be summed to provide a summed signal indicative of unsteady pressures within the pipe at the common axial position.

In one aspect of the invention, the sensor head is used in a device including a signal processor that provides an output signal indicative of at least one parameter determined from the signals from one or more arrays of transducers.

In another aspect of the invention, an apparatus for characterizing unsteady pressures in a fluid flowing within a pipe includes at least one transducer for coupling to an outer surface of a pipe by a coupling arrangement. The at least one transducer is responsive to radial expansion and contraction of the pipe caused by internal pressure changes of a medium flowing therein, and provides a transducer signal containing information about the radial expansion and contraction of the pipe. A signal processor provides an output signal indicative of at least one parameter determined from the transducer signal. The at least one transducer may include a plurality of transducers arranged axially along and/or circumferentially around the pipe. For example, the at least one transducer may include two or more transducers diametrically opposed on the outer surface of the pipe to compensate for bending modes caused by the flexing of the pipe.

In one embodiment, the at least one transducer includes a strain sensor. In another embodiment, the at least one transducer includes a spring element in the form of a diaphragm that is coupled capacitively to another surface of a transducer so that pipe radial growth causes a displacement in the diaphragm which is sensed as a change in capacitance between the diaphragm and the other surface. In another embodiment, the at least one transducer includes an accelerometer. In another embodiment, the at least one transducer includes a piezoelectric or magnetostrictive structure that provides a voltage or charge when strained.

In various embodiments, the coupling arrangement is a strap and the at least one transducer is loaded against the outer surface of the pipe by the strap. Also in various embodiments, the apparatus includes a mechanical link arranged between the at least one transducer and the outer surface of the pipe.

The foregoing and other objects, features and advantages of the present invention will become more apparent in light of the following detailed description of exemplary embodiments thereof.

BRIEF DESCRIPTION OF THE DRAWINGS

Referring now to the drawing wherein like elements are numbered alike in the various Figures:

FIG. 1 is schematic diagram of an apparatus having an array of contact-based transducers mounted on a handle assembly for measuring a parameter of a flow passing within a pipe, in accordance with an embodiment of the present invention.

FIG. 2 is a schematic diagram of a sensor head for the apparatus of FIG. 1 in contact with the pipe.

FIG. 3 is an end view of the sensor head for the apparatus of FIG. 1 taken along section 3—3 of FIG. 1.

FIG. 5 is an end view of a sensor head for the apparatus of FIG. 4 taken along section 5—5 of FIG. 4.

FIG. 7 is an end view of a sensor head for the apparatus of FIG. 6 taken along section 7—7 of FIG. 6.

FIG. 8 is an end view of the sensor head for the apparatus of FIG. 6 including additional transducer arrays disposed around the pipe.

FIG. 10 is an end view of a sensor head for the apparatus of FIG. 9 taken along section 10—10 of FIG. 9.

FIG. 12 is an end view of a sensor head for the apparatus of FIG. 11 taken along section 12—12 of FIG. 11.

FIG. 13 is an end view of the sensor head for apparatus of FIG. 11 including additional transducer arrays disposed around the pipe.

DETAILED DESCRIPTION

Figure 4:
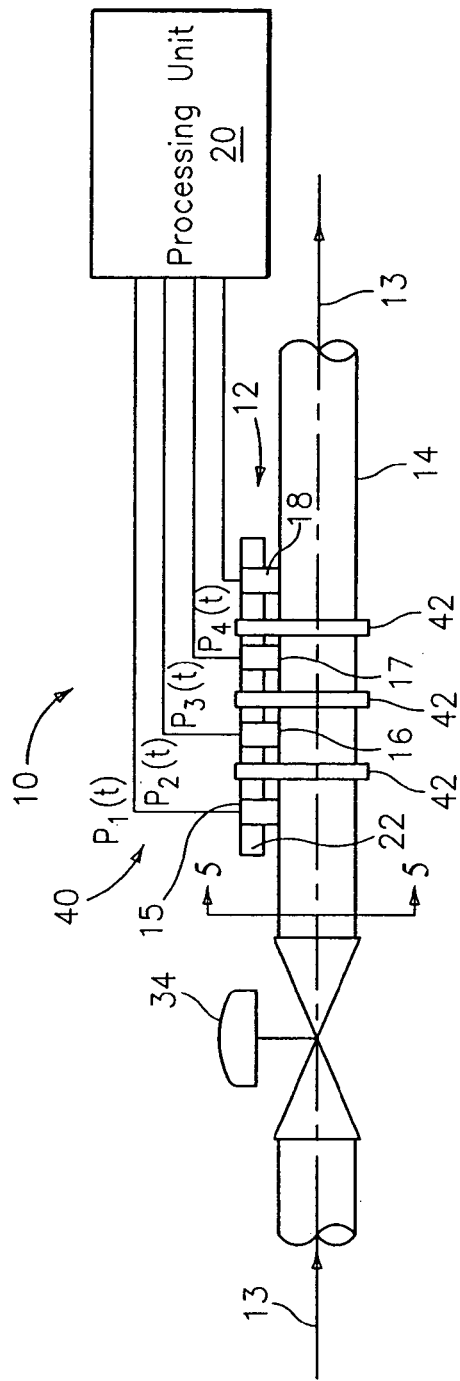
FIG. 4 is a schematic diagram of another embodiment of an apparatus having an array of contact-based transducers for measuring a parameter of a flow passing within a pipe.

As described in U.S. patent application Ser. Nos. 10/007,749, 10/349,716, 10/376,427, which are all incorporated herein by reference, unsteady pressures along a pipe, as may be caused by one or both of acoustic waves propagating through the fluid within the pipe and/or pressure disturbances that convect with the fluid flowing in the pipe (e.g., turbulent eddies and vortical disturbances), contain useful information regarding parameters of the fluid and the flow process. For many applications, the unsteady pressures can be sufficiently characterized with contact-based transducers. This disclosure describes a sensor head that contains a plurality of transducers (sensors) in an axial array, which is put into contact with the surface of a pipe, duct or other form of conduit (hereinafter "pipe") to characterize the unsteady pressures in the fluid.

Referring to FIGS. 1 and 2, a flowmeter (apparatus) 10 includes a sensor head 11 comprising an array of transducers (transducer array) 12 designed to measure unsteady pressures at multiple locations along a pipe 14. The transducer array 12 measures the unsteady pressures by detecting the displacement, strain, velocity, or acceleration of the pipe wall. Output signals $P_1(t)$, $P_2(t)$, $P_3(t)$, $P_4(t)$ from the transducers (sensors) 15, 16, 17, and 18, respectively, in the array 12 are provided to a processing unit 20, which processes the output signals to provide a signal indicative of at least one parameter (parameter) 21 of the flow process, as will be described in further detail hereinafter.

The sensor head 11 comprises a rigid support structure 22, which provides the desired spacing between the transducers 15, 16, 17, and 18 and holds the transducer array 12 in contact with an outer surface of the pipe 14, which has a fluid 13 passing therethrough, as shown in FIG. 2. The support structure 22 also provides an inertial or fixed reference against which the transducers 15, 16, 17, and 18 can measure the displacement, strain, velocity, or acceleration of the pipe wall caused by sound propagating through the fluid 13 and/or unsteady pressures created by vortical disturbances (eddies) propagating within the fluid 13.

The pressure signals $P_1(t)$, $P_2(t)$, $P_3(t)$, $P_4(t)$ provided by each respective transducer 15, 16, 17, 18 are indicative of unsteady pressure within the pipe 14 at a corresponding axial location of the pipe 14. While the array 12 is shown as including four transducers, it is contemplated that the array 12 may include two or more transducers, each providing a pressure signal P(t) indicative of unsteady pressure within the pipe 14 at a corresponding axial location of the pipe 14. For example, the array 12 may include 2, 3, 4, 5, 6, 7, 8, 9, 10, 11, 12, 13, 14, 15, 16, 17, 18, 19, 20, 21, 22, 23, or 24 transducers. Generally, the accuracy of the measurement improves as the number of transducers in the array 12 increases. The degree of accuracy provided by the greater number of transducers is offset by the increase in complexity and time for computing the desired output parameter of the flow. Therefore, the number of transducers used is dependent at least on the degree of accuracy desired and the desire update rate of the output parameter provided by the apparatus 10.

The pressure signals $P_1(t)$, $P_2(t)$, $P_3(t)$, $P_4(t)$ provided by each respective transducer 15, 16, 17, 18 are processed by a signal processor 19 within the processing unit 20. The signal processor 19 applies this data to flow logic 36 executed by signal processor 19 to determine one or more parameters 21 of the flow process, such as volumetric flow rate, mass flow rate, density, composition, entrained air, consistency, particle size, velocity, mach number, speed of sound propagating through the fluid 13, and/or other parameters of the fluid 13. The flow logic 36 is described in further detail hereinafter.

The signal processor 19 may also apply one or more of the pressure signals $P_1(t)$, $P_2(t)$, $P_3(t)$, $P_4(t)$ and/or one or more parameters 21 from the flow logic 36 to diagnostic logic 38. Diagnostic logic 38 is executed by signal processor 19 to diagnose the health of any device 34 in the process flow that causes unsteady pressures to be generated in the section of the pipe 14 where sensor head 11 is disposed. In FIG. 1, device 34 is depicted as a valve; however, it is contemplated that device 34 may be any machinery, component, or equipment, e.g., motor, fan, pump, generator, engine, gearbox, belt, drive, pulley, hanger, clamp, actuator, valve, meter, or the like. The signal processor 19 may output one or more parameters 21 indicative of the health of the diagnosed device 34. The diagnostic logic 38 is described in further detail hereinafter.

The signal processor 19 may be one or more signal processing devices for executing programmed instructions, such as one or more microprocessors or application specific integrated circuits (ASICS), and may include memory for storing programmed instructions, set points, parameters, and for buffering or otherwise storing data. For example, the signal processor 19 may be a microprocessor and the processing unit 20 may be a personal computer or other general purpose computer.

The one or more parameters 21 may be output to a display 24 or another input/output (I/O) device 26. The I/O device 26 also accepts user input parameters 23 as may be necessary for the flow logic 36 and diagnostic logic 38. The I/O device 26, display 24, and signal processor 19 unit may be mounted in a common housing, which may be attached to the sensor head 11 by a flexible cable 28, wireless connection, or the like. The flexible cable 28 may also be used to provide operating power from the processing unit 20 to the sensor head 11 if necessary. For example, transducers 15-18 may incorporate powered amplifier circuits to amplify or otherwise condition the output signals $P_1(t)$, $P_2(t)$, $P_3(t)$, $P_4(t)$.

In the embodiment of FIGS. 1 and 2, a handheld pitchfork like sensor head 11 is shown, wherein the transducers 15, 16, 17, and 18 include accelerometers or other force transducers mounted to a bar-shaped support structure 22, which has a handle 30 extending therefrom. FIG. 1 depicts the sensor head 11 positioned away from the pipe 14, and FIG. 2 depicts the sensor head 11 in contact with the outer surface of pipe 14. The support structure 22 is sufficiently rigid to maintain the spacing, but sufficiently flexible to provide a locally reacting measurement form each of the transducers 15, 16, 17, and 18. The transducers 15, 16, 17, and 18 are spaced a predetermined distance "d", which may be, for example, approximately 6 inches. While the spacing is shown to be equal, it is contemplated that the spacing may be unequal.

FIG. 3 is an end view of the sensor head 11 of FIGS. 1 and 2, as taken along section 3—3 of FIG. 2. As can be seen in FIG. 3, each transducer 15, 16, 17, and 18 may typically include an accelerometer or other transducer element 31 coupled to a standoff probe (mechanical link) 32 having a tip 33 for contacting the outer surface of the pipe 14. It is also contemplated that each transducer 15, 16, 17, and 18 may include the transducer element 31 alone. The sensor head 11 may utilize any transducer elements 31 capable of measuring the unsteady (or ac or dynamic) pressures within a pipe 14, such as piezoelectric devices, optical devices, capacitive devices, resistive devices (e.g., Wheatstone bridge or Piezoresistive devices), accelerometers (or geophones), velocity measuring devices, displacement measuring devices, inductance and reluctance measuring devices (e.g., responsive to displacement of a ferromagnetic core), magnetostrictive devices (e.g., responsive to the change in permeability of ferromagnetic materials under applied stress), etc. However, the preferred embodiment uses accelerometers. For example, accelerometers such as the Servo K-beam accelerometers available from Kistler Instrument Corp. of Amherst, N.Y. may be used. Typically, unsteady pressures caused by one or both of acoustic waves propagating through the fluid within the pipe and/or pressure disturbances that convect with the fluid flowing in the pipe are responsible for a significant fraction of the radial acceleration of the pipe wall in the relative high frequency range of 100–2000 Hz.

In one embodiment of the present invention, the transducer elements 31 comprise pressure sensors manufactured by PCB Piezotronics of Depew, N.Y. In one pressure sensor there are integrated circuit piezoelectric voltage mode-type sensors that feature built-in microelectronic amplifiers, that convert the high-impedance charge into a low-impedance voltage output. For example, a Model 106B manufactured by PCB Piezotronics may be used which is a high sensitivity, acceleration compensated integrated circuit piezoelectric quartz pressure sensor suitable for measuring unsteady pressures in hydraulic and pneumatic systems. The 106B has the capability to measure small pressure changes of less than 0.001 psi under high static conditions, and has a 300 mV/psi sensitivity and a resolution of 91 dB (0.0001 psi).

In another embodiment, the transducer elements 31 may include a piezoelectric material to measure the unsteady pressures of the fluid 13. The piezoelectric material, such as the polymer, polarized fluoropolymer, polyvinylidene fluoride (PVDF), measures the strain induced within the process pipe 14 due to unsteady pressure variations within fluid 13. Strain within the pipe 14 is transduced to an output voltage or current by the attached piezoelectric pressure transducers 15–18. The transducer elements 31 may alternatively include a load cell, a magnetostrictive structure, or any other transducer element that provides a voltage or charge when strained.

In yet another embodiment, the transducer element 31 may include a strain sensor (strain gage), which may be a spring element or transducer in the form of a diaphragm that is coupled capacitively to a surface so that pipe 14 radial growth causes a displacement in the diaphragm which is sensed as a change in capacitance between the diaphragm and the surface. Embodiments are also envisioned using a diaphragm in a resistive-based configuration. Similar capacitive sensors are available from Physik Instrumente (PI) GmbH & Co. KG, Karlsruhe/Palmbach, Germany.

Embodiments are envisioned using many different types of transducer elements 31, including those based on shearing strain, Poisson strain, bending or moment strain, as well as transducer elements 31 that employ mechanical, optical, acoustic, pneumatic and/or electrical means. The scope of the invention is not intended to be limited to the type or kind of transducer element 31 used. For example, see U.S. Pat. No. 6,463,813, which discloses a displacement based pressure sensor, which is hereby incorporated by reference in its entirety.

The transducer element 31 may be facing away from the outer surface of the pipe 14 or facing the outer surface of the pipe 14. In embodiments in which the transducer element 31 is facing away from the outer surface of the pipe 14, compensation may have to be made in relation to the phase of the sensed signal.

The overall length "L" of the standoff probe 32 may be selected to protect the transducer element 31 from a potentially harmful condition (e.g., high temperature) proximate the pipe 14. In addition, the tip 33 of the standoff probe 32 may be pointed to allow the standoff probe 32 to penetrate a material surrounding the pipe 14. For example, the standoff probe 32 may penetrate pipe insulation or soil to allow the sensor head 11 to take measurements of insulated or buried pipes 14.

While the sensor head 11 may be used without the standoff probe 32 and tip 33, an important advantage of using the standoff probe 32 is that it enables the measurement of the unsteady pressures over the 100–2000 Hz range with minimal exposure of the transducer elements 31 to the process conditions. This technique enables measurement of fluids with temperatures that exceed the maximum operating temperature of the transducer elements 31. This is particularly important for steam lines, in which a temperature of 1200 F is fairly common.

The flow meter 10 of FIGS. 1, 2 and 3 allows for rapid characterization of unsteady pressures within the fluid 13 and thus provides insight into a host of important process parameters. The handheld sensor head 11 accompanied by a portable processing unit 20 allows a field technician to transport the flowmeter 10 to various locations in an industrial flow process for measuring various parameters of the fluid 13 and/or for monitoring the health of devices 34 in the flow process.

FIGS. 4–8 illustrate another embodiment of the present invention, wherein a sensor head 40 includes at least one transducer array 12 attached to a bar-shaped support structure 22, which is then strapped or otherwise clamped onto the pipe 14. Similarly to that described hereinbefore, the support structure 22 is sufficiently rigid to maintain the spacing of the transducers 15, 16, 17, and 18, but sufficiently flexible to provide a locally reacting measurement form each of the transducers 15, 16, 17, and 18. FIG. 4 illustrates one transducer array 12 mounted to one side of the pipe 14 for measuring the unsteady pressures within the fluid 13. The support structure 22 holding the transducer array 12 is secured to the pipe by straps 42. FIG. 5 is an end view of the sensor head 40 of FIG. 4. As can be seen in FIG. 5, each transducer 15, 16, 17, and 18 may typically include an accelerometer or other force transducer element 31 coupled to a standoff probe (mechanical link) 32 for contacting the outer surface of the pipe 14.

Figure 6:
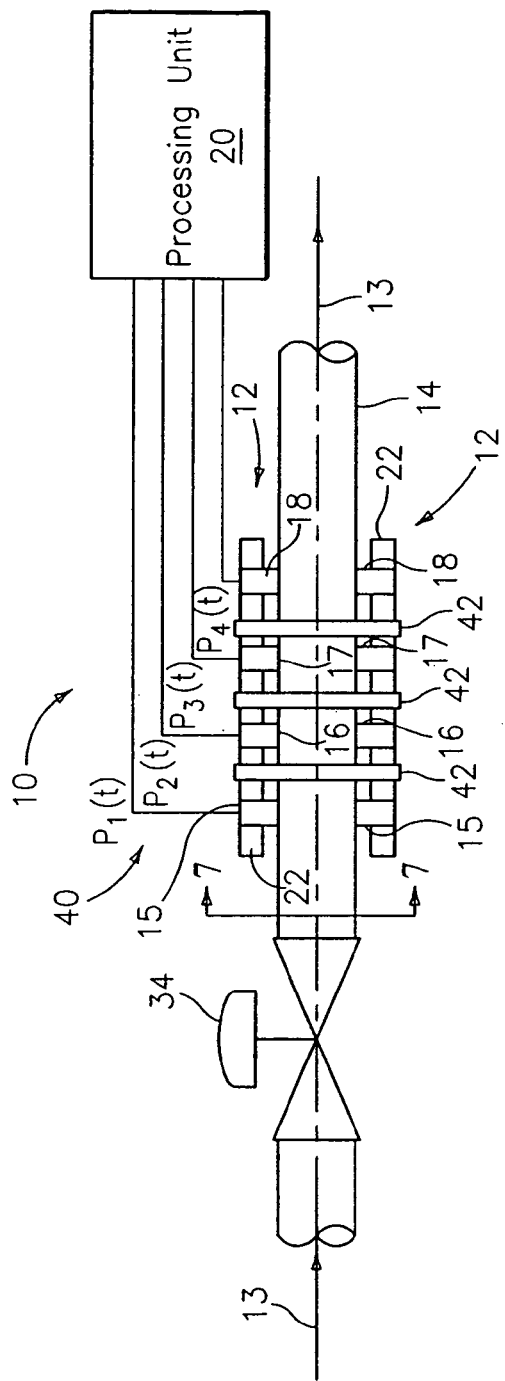
FIG. 6 is a schematic diagram of another embodiment of an apparatus having at least two arrays of contact-based transducers for measuring a parameter of a flow passing within a pipe.
Figure 9:
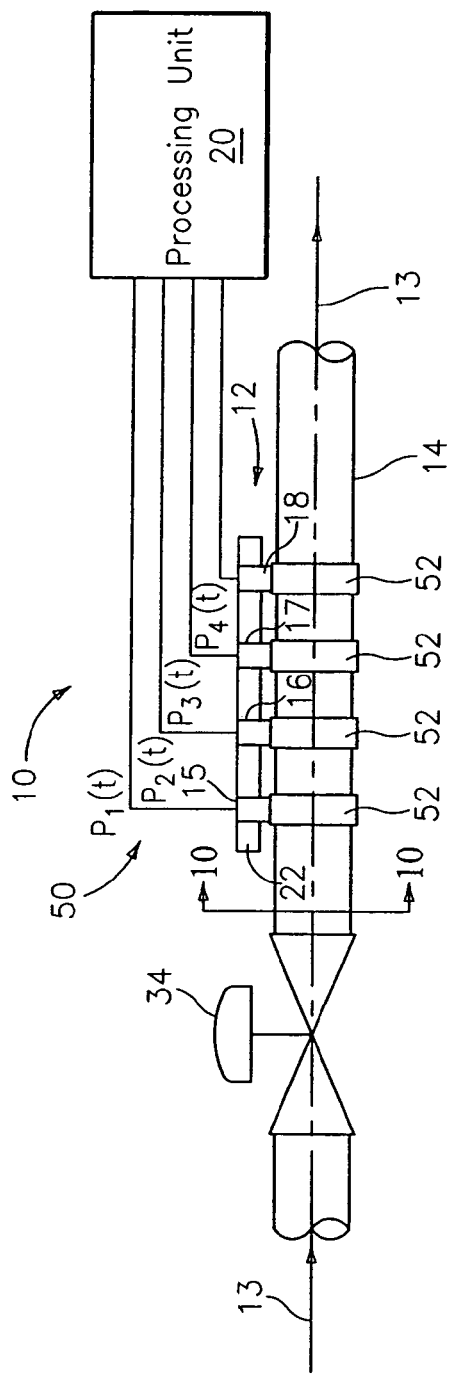
FIG. 9 is a schematic diagram of another embodiment of an apparatus having an array of contact-based transducers for measuring a parameter of a flow passing within a pipe.

Alternatively, FIGS. 6 and 7 illustrate the sensor head 40 including a second transducer array 12 mounted diametrically opposed to the first transducer array 12. The use of a second array 12 reduces errors associated with vibration or bending modes of the pipe 14. In effect, the use of transducer arrays 12 on opposing sides of the pipe 14 cancels everything out but the breathing mode of the pipe 14.

Each of the transducers 15, 16, 17, and 18 in the second transducer array 12 is associated with a corresponding one of the transducers 15, 16, 17, and 18 in the first transducer array 12 at a common axial position of the pipe 14. As such, each pair of corresponding transducers outputs signals indicative of unsteady pressures within the fluid at the common axial position. Preferably, the output signals for each axial position are summed at the sensor head 40 before being provided to the processing unit 20. Thus, each signal $P_1(t)$, $P_2(t)$, $P_3(t)$, and $P_4(t)$ provided to the processing unit 20 would be a sum of the signals output from the arrays 12 at the corresponding axial position (e.g., $P_1(t)$=(sum of transducer 15 outputs); $P_2(t)$=(sum of transducer 16 outputs); $P_3(t)$=(sum of transducer 17 outputs); and $P_4(t)$=(sum of transducer 18 outputs)). The signals may be summed using any convenient circuit, such as, for example, an operational amplifier (op-amp) arranged as an adder (summing amplifier).

While the embodiment of FIGS. 6 and 7 shows two sets of transducer arrays 12, the present invention contemplates a plurality of arrays 12 disposed circumferentially around the pipe 14. For example, FIG. 8 includes eight arrays 12 evenly disposed around the pipe 14.

FIGS. 9–13 illustrate another embodiment of the present invention, wherein a sensor head 50 includes at least one transducer array 12 wherein each of the transducers 15, 16, 17, and 18 are strapped or clamped onto pipe 14 to form an array disposed axially along the pipe 14. The embodiment may include a bar-shaped support structure 22 to connect and provide the desired spacing between the transducers 15, 16, 17, and 18. Similarly to that described hereinbefore, the support structure 22 is sufficiently rigid to maintain the spacing, but sufficiently flexible to provide a locally reacting measurement form each of the transducers 15, 16, 17, and 18. FIG. 5 illustrates one array 12 mounted to one side of the pipe 14 for measuring the unsteady pressures within the fluid 13. The transducer array 12 is secured to the pipe 14 by straps 52, and the support structure 22 provides an inertial reference for the transducers 15, 16, 17, and 18 to measure the displacement, strain, velocity, or acceleration of the pipe wall. FIG. 10 is an end view of the sensor head 50 of FIG. 9.

Figure 11:
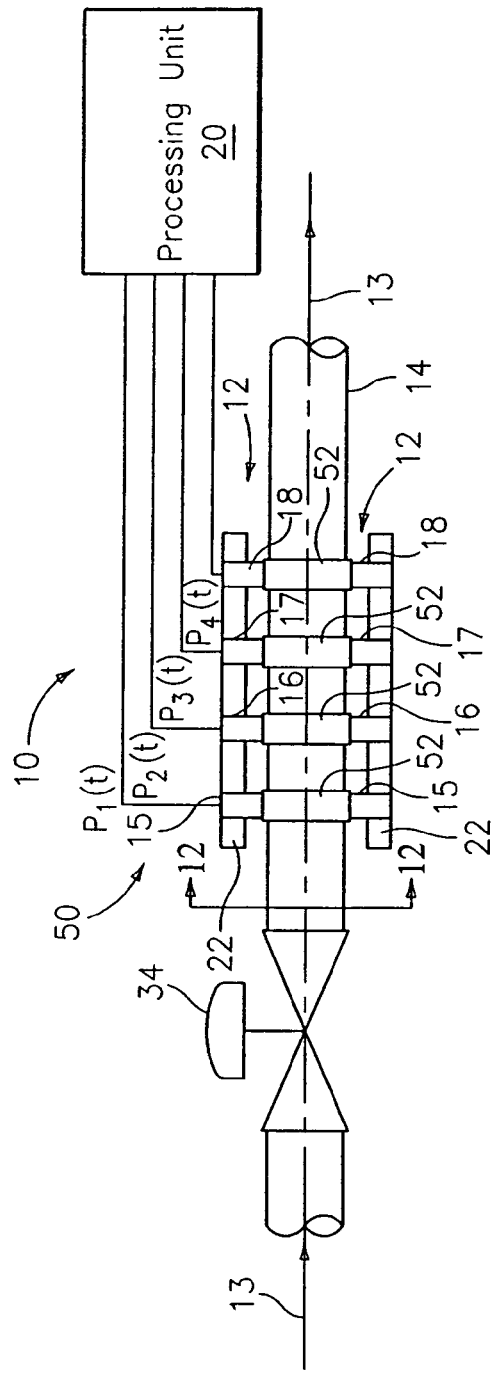
FIG. 11 is a schematic diagram of another embodiment of an apparatus having at least two arrays of contact-based transducers for measuring a parameter of a flow passing within a pipe.

Alternatively, FIGS. 11 and 12 illustrate the sensor head 50 including a second transducer array 12 mounted diametrically opposed to the first transducer array 12. The use of a second array 12 reduces errors associated with vibration or bending modes of the pipe 14. As previously noted, the use of transducer arrays 12 on opposing sides of the pipe 14 cancels everything out but the breathing mode of the pipe 14.

Each of the transducers 15, 16, 17, and 18 in the second transducer array 12 is associated with a corresponding one of the transducers 15, 16, 17, and 18 in the first transducer array 12 at a common axial position of the pipe 14. As such, each pair of corresponding transducers output signals indicative of unsteady pressures within the fluid at the common axial position. Preferably, the output signals for each axial position are summed at the sensor head 50 before being provided to the processing unit 20. Thus, each signal $P_1(t)$, $P_2(t)$, $P_3(t)$, and $P_4(t)$ provided to the processing unit 20 would be a sum of the signals output from the arrays 12 at the corresponding axial position (e.g., $P_1(t)$=(sum of sensor 15 outputs); $P_2(t)$=(sum of sensor 16 outputs); $P_3(t)$=(sum of sensor 17 outputs); and $P_4(t)$=(sum of sensor 18 outputs)). The signals may be summed using any convenient circuit, such as, for example, an operational amplifier (op-amp) arranged as an adder (summing amplifier).

While the invention shows two sets of arrays of transducers 12, the present invention contemplates a plurality of arrays 12 disposed circumferentially around the pipe 14. For example, FIG. 13 includes eight arrays 12 evenly disposed around the pipe 14.

Figure 14:
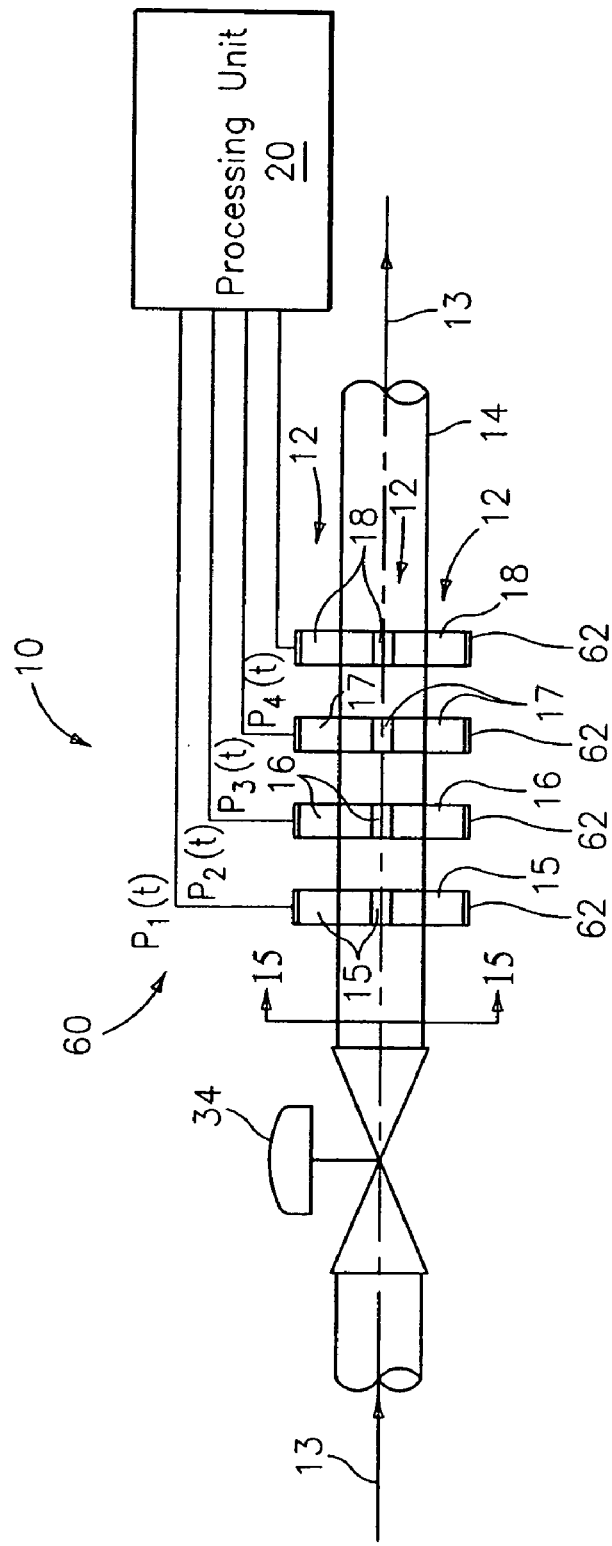
FIG. 14 is a schematic diagram of another embodiment of an apparatus having at least two arrays of contact-based transducers for measuring a parameter of a flow passing within a pipe.
Figure 15:
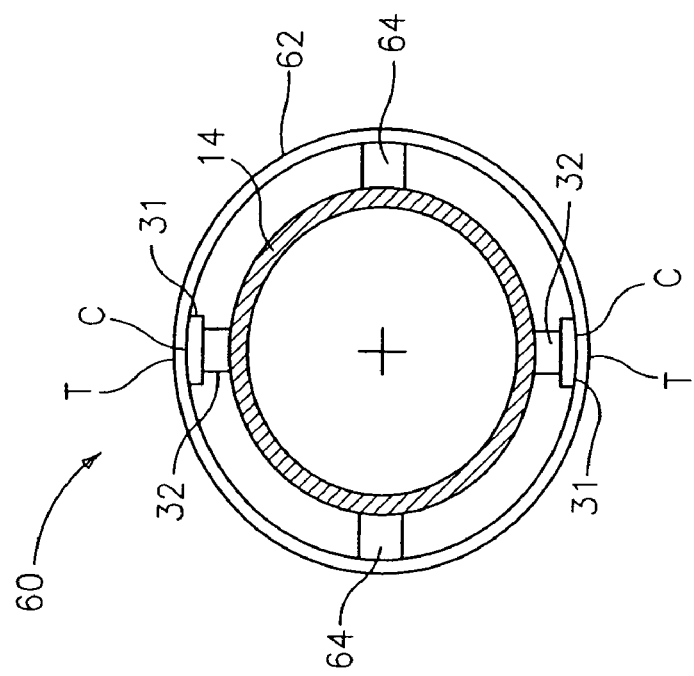
FIG. 15 is an end view of a sensor head for the apparatus of FIG. 14 taken along section 15—15 of FIG. 14.

FIGS. 14 and 15 illustrate another embodiment of the present invention, wherein a sensor head 60 includes at least one transducer array 12 and wherein each of the transducers 15, 16, 17, and 18 are strapped or clamped onto pipe 14 to form an array disposed axially along the pipe 14. The one or more transducer arrays 12 are secured to the pipe 14 by straps 62, and the strap 62, which forms a ring around the transducers 15, 16, 17, or 18 at each axial location of the pipe 14, acts as a support structure and provides an inertial reference for the transducers 15, 16, 17, and 18 to measure the displacement, strain, velocity, or acceleration of the pipe wall. It is contemplated that the straps (rings) 62 may also be mechanically coupled to an external ground. As in previous embodiments the output signals from sensors 15, 16, 17 and 18 for each axial position are summed at the sensor head 60 before being provided to the processing unit 20. FIG. 15 is an end view of the sensor head 60 of FIG. 14. While FIGS. 14 and 15 show four transducer arrays 12, it is contemplated that one or more arrays 12 may be disposed on the pipe 14.

In FIGS. 14 and 15, each ring 42 is attached to the outer surface of the pipe 14 through the transducers 15, 16, 17, or 18. Alternatively, a single ring 62 extending along the entire length of the transducer arrays 12 may be disposed around the pipe 14.

Figure 16:
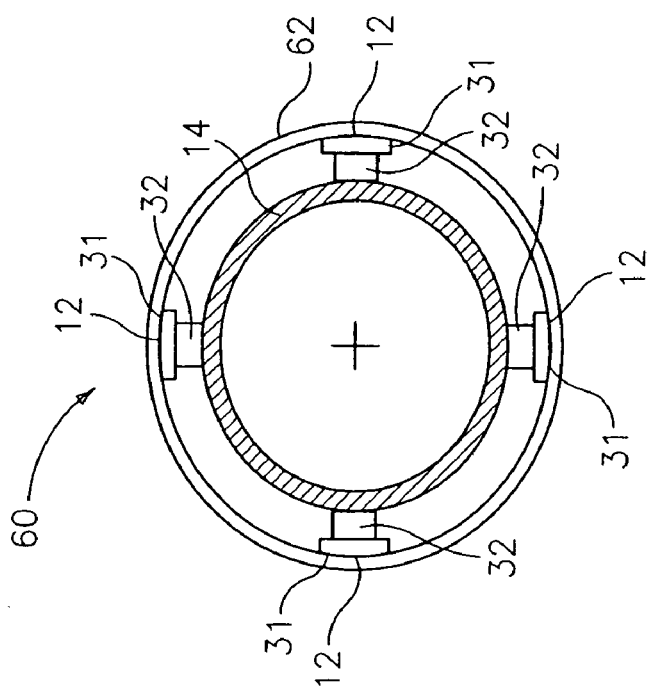
FIG. 16 is an end view of the sensor head for the apparatus of FIG. 14 wherein the pipe is anchored to a ring surrounding a plurality of transducers.

If, as shown in FIGS. 14 and 15, the transducers 15, 16, 17, and 18 support the rings 62 relative to the pipe 14 then all radial growth of the pipe 14 goes into strain of the transducers 15, 16, 17, and 18. However, the rings 62 can subject the transducers 15, 16, 17, and 18 to transverse inertial loads. If, on the other hand, the rings 62 are anchored to the external surface of pipe 14 by way of mechanical links 64, as shown in FIG. 16, then transverse loads originating from inertial forces on the rings 62 are to some degree absorbed by the pipe 14. In addition, modeling suggests that anchoring the pipe 14 through mechanical links 64 causes amplified deflection of the pipe surface 90 degrees from the point at which it is anchored, resulting in increased sensitivity at the area sensed by the transducer arrays 12.

In the embodiments of FIGS. 14–16, it is contemplated that the transducers 15, 16, 17, and 18 may be incorporated into the ring 62 itself in a tangential orientation so as to measure the hoop stress in the ring 62.

Yet another approach, applicable to the embodiment of FIG. 16, would be to measure bending stress in the rings 62 using a Morehouse ring. With the arrangement of FIG. 16, where the rings 62 are anchored to the pipe 14 at diametrically opposite points by mechanical links 64, the strain distribution in each ring 62 is a complex function of its geometry, and is significantly affected by the design details of the mechanical links 64. However, because the bending moment does not vary significantly in the region of the transducer arrays 12, the strain distribution is nearly uniform in this area. The strain can be measured with strain gauges located at C (compression) and T (tension) positions.

If the rings 62 are not supported by the pipe 14 but instead are attached to an external ground, then radial growth of the pipe 14 could also be measured with, for instance, a load cell. This approach is not preferred given that one needs to be concerned both with the motion of the pipe 14 and the motion of the external reference point.

In implementing the embodiments of FIGS. 14–16, sensitivity to internal pressure fluctuations should be maximized in order to maximize the signal of interest in comparison to any noise in the system (signal/noise). The mass of the ring 62 should be minimized, and the stiffness of the ring 62 should be maximized. If the ring 62 is high in mass or low in stiffness it could have vibration modes in a frequency of interest that contribute signals not associated with pipe wall growth (i.e., noise). Moreover, by minimizing the mass of ring 62, the deformations in the pipe 14 resulting from the inertial forces of the ring 62 are also minimized. Finally, as much of the circumference of pipe 14 should be monitored as possible. As previously discussed, this allows signals on opposing sides of the pipe 14 to be summed and, thus, cancels errors associated with vibration or bending modes of the pipe 14.

EXAMPLES

Various tests were conducted to show that internal pressures correlate to a measurement of radial growth of pipe outer diameter (OD). For example, a test was conducted using an off-the-shelf Piezoelectric crystal based load cell Model 208C1 manufactured by PCB Piezotronics of Depew, N.Y. strapped to a pipe using a stiff U-clamp outer ring or less stiff ring created by a 0.025" thick hose clamp. This test confirmed that there is correlation between internal pressures measured with a PCB 102M206 ported (invasive) pressure transducer and the signals arising from the load cell. The test was conducted on an 8" diameter schedule 10 standpipe filled with water and with a bubbler for a sound (dynamic pressure) source.

In this test, the ported pressure sensor was arranged in a pipe, and a single load cell was secured at the same location on the outside of the pipe using a single hose clamp. The ported pressure sensor provided a direct measurement of the unsteady pressures in the fluid flowing in the pipe. The single banded load cell, which was arranged on the outside of the pipe, provided a corresponding measurement of the unsteady pressures in the fluid flowing in the pipe.

Figure 17:
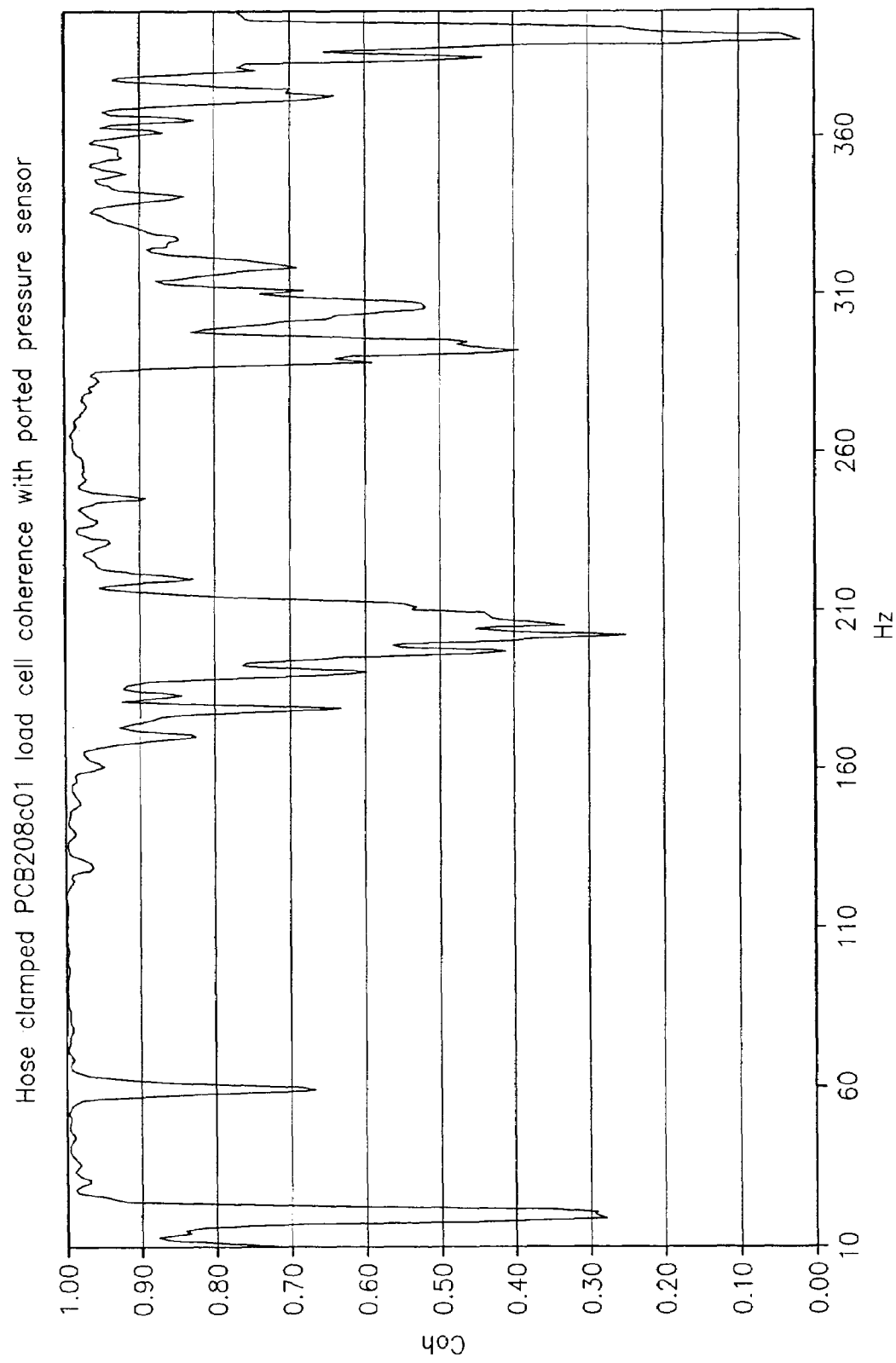
FIG. 17 is a plot depicting coherence of the output from a load cell strapped to a pipe with the output from a ported pressure sensor disposed in the pipe.

The output signal from the load cell (test data) was compared with the output signal from the ported pressure sensor (reference data) at various frequencies, and the coherence of the two measurements at the various frequencies was plotted, as shown in FIG. 17. Where the reference data is equal to the test data, the plot of FIG. 17 shows a coherence of 1.0. Conversely, where the reference data differs from the test data, the plot of FIG. 17 shows a coherence less than 1.0. In general, the plot of FIG. 17 shows good coherence (e.g., at or near 1.0) between the load cell and the ported sensor.

Diagnostic Logic

Figure 18:
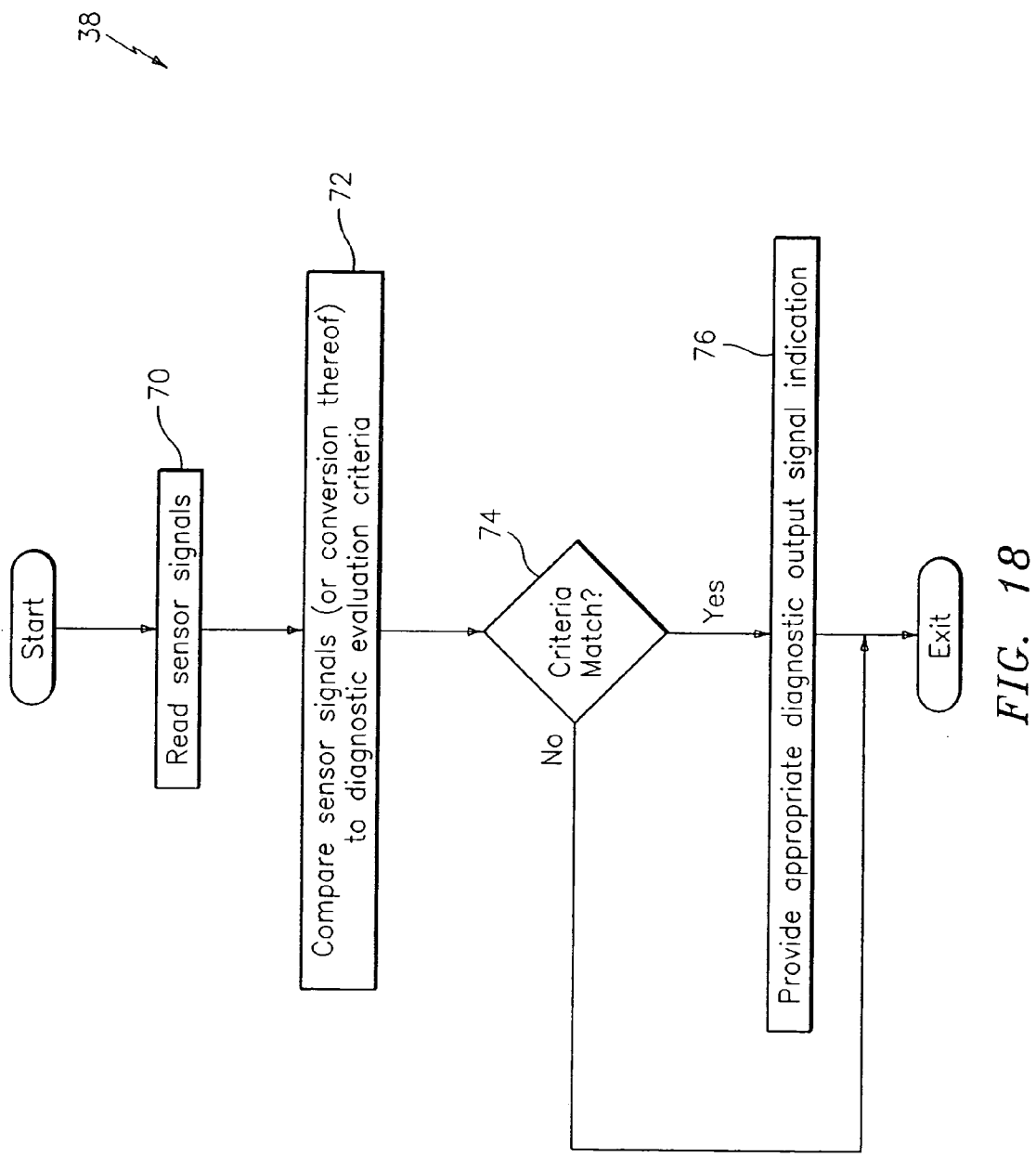
FIG. 18 is a flow chart depicting operation of a diagnostic logic used in the apparatus of the present invention.

Referring to FIG. 18, the diagnostic logic 38 measures the sensor input signals (or evaluation input signals), which may include one or more of the pressure signals $P_1(t)$, $P_2(t)$, $P_3(t)$, $P_4(t)$ and the parameters 21, at a step 70. Next, the diagnostic logic 38 compares the evaluation input signals to a diagnostic evaluation criteria at a step 72, discussed hereinafter. Then, a step 74 checks if there is a match, and if so, a step 76 provides a diagnostic signal indicative of the diagnostic condition that has been detected and may also provide information identifying the diagnosed device. The diagnostic signal may be output as a parameter 21.

Where the evaluation input signal is a parameter 21, as may be output from the flow logic 36, the diagnostic evaluation criteria may be based on a threshold value of the flow signal 24. For example, the threshold value may be indicative of a maximum or minimum sound speed, mach number, consistency, composition, entrained air, density, mass flow rate, volumetric flow rate, or the like. If there is not a criteria match in step 74, the diagnostic logic 38 exits.

Where the evaluation input signal includes one or more pressure signals $P_1(t)$, $P_2(t)$, $P_3(t)$, $P_4(t)$, the diagnostic evaluation criteria may be a threshold (maximum or minimum) pressure. Alternatively, the diagnostic evaluation criteria may be based on an acoustic signature, or a convective property (i.e., a property that propagates or convects with the flow). For example, the diagnostic logic 38 may monitor the acoustic signature of any upstream or downstream device (e.g., motor, fan, pump, generator, engine, gear box, belt drive, pulley, hanger, clamp, actuator, valve, meter, or other machinery, equipment or component). Further, the data from the array of sensors 15–18 may be processed in any domain, including the frequency/spatial domain, the temporal/spatial domain, the temporal/wave-number domain, or the wave-number/frequency (k-ω) domain or other domain, or any combination of one or more of the above. As such, any known array processing technique in any of these or other related domains may be used if desired.

For example, for three unsteady pressure signals, the equations in the frequency/spatial domain equation would be: $P(x,\omega)=Ae^{-ik_rx}+Be^{+ik_rx}$; the temporal/spatial domain would be: $P(x,t)=(Ae^{-ik_rx}+Be^{+ik_rx})e^{i\omega t}$; and the k-ω domain (taking the spatial Fourier transform) would be:

$$P(k, \omega) = \frac{1}{2\pi}\int_{-\infty}^{+\infty} P(x, \omega)e^{ikx}dx = A(\omega)\delta\left(k - \frac{\omega}{a}\right) + B(\omega)\delta\left(k + \frac{\omega}{a}\right)$$

where k is the wave number, α is the speed of sound of the material, x is the location along the pipe, ω is frequency (in rad/sec, where $\omega=2\pi f$), and δ is the Dirac delta function, which shows a spatial/temporal mapping of the acoustic field in the k-ω plane.

Any technique known in the art for using a spatial (or phased) array of sensors to determine the acoustic or convective fields, beam forming, or other signal processing techniques, may be used to provide an input evaluation signal to be compared to the diagnostic evaluation criteria.

Flow Logic

Velocity Processing

Figure 19:
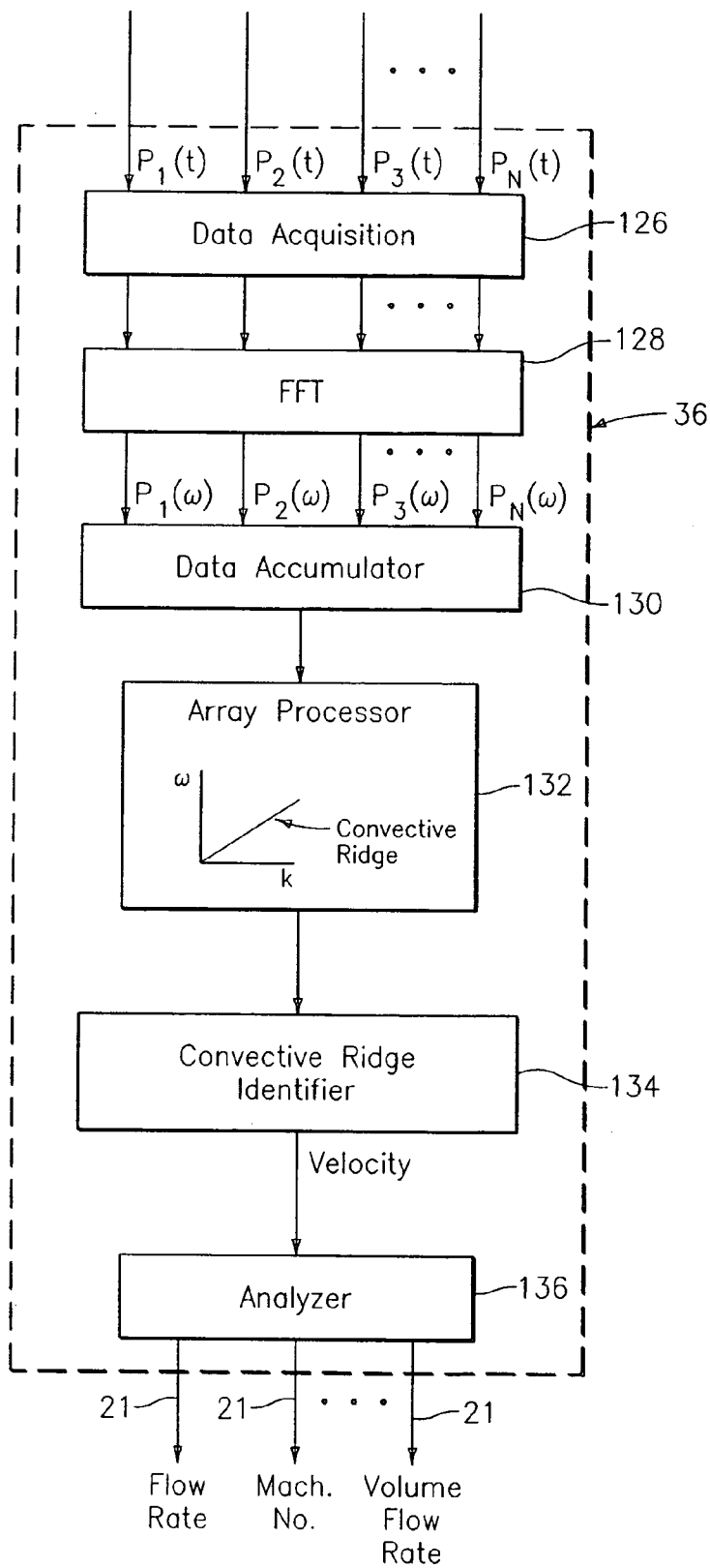
FIG. 19 is a block diagram of a first embodiment of a flow logic used in the apparatus of the present invention.

Referring to FIG. 19, an example of flow logic 36 is shown. As previously described, each array of at least two sensors located at two locations $x_1,x_2$ axially along the pipe 14 sense respective stochastic signals propagating between the sensors within the pipe at their respective locations. Each sensor provides a signal indicating an unsteady pressure at the location of each sensor, at each instant in a series of sampling instants. One will appreciate that each sensor array may include more than two sensors distributed at locations $x_1 \ldots x_N$. The sensors provide analog pressure time-varying signals $P_1(t),P_2(t),P_3(t),P_N(t)$ to the flow logic 36.

The flow logic 36 processes the signals $P_1(t),P_2(t),P_3(t),P_N(t)$ to first provide output signals (parameters) 21 indicative of the pressure disturbances that convect with the fluid (process flow) 13, and subsequently, provide output signals in response to pressure disturbances generated by convective waves propagating through the fluid 13, such as velocity, Mach number and volumetric flow rate of the process flow 13. The flow logic 36 processes the pressure signals to first provide output signals indicative of the pressure disturbances that convect with the process flow 13, and subsequently, provide output signals in response to pressure disturbances generated by convective waves propagating through the process flow 13, such as velocity, Mach number and volumetric flow rate of the process flow 13.

The flow logic 36 receives the pressure signals from the array of sensors 15–18. A data acquisition unit 126 (e.g., A/D converter) converts the analog signals to respective digital signals. The FFT logic 128 calculates the Fourier transform of the digitized time-based input signals $P_1(t)-P_N(t)$ and provides complex frequency domain (or frequency based)

signals $P_1(\omega),P_2(\omega),P_3(\omega),P_N(\omega)$ indicative of the frequency content of the input signals. Instead of FFT's, any other technique for obtaining the frequency domain characteristics of the signals $P_1(t)$–$P_N(t)$, may be used. For example, the cross-spectral density and the power spectral density may be used to form a frequency domain transfer functions (or frequency response or ratios) discussed hereinafter.

One technique of determining the convection velocity of the turbulent eddies 120 within the process flow 13 is by characterizing a convective ridge of the resulting unsteady pressures using an array of sensors or other beam forming techniques, similar to that described in U.S. patent application, Ser. No. 10/077,736 and U.S. patent application Ser. No. 09/729,994 filed Dec. 4, 200, now U.S. Pat. No. 6,609,069, which are incorporated herein by reference.

A data accumulator 130 accumulates the frequency signals $P_1(\omega)$–$P_N(\omega)$ over a sampling interval, and provides the data to an array processor 132, which performs a spatial-temporal (two-dimensional) transform of the sensor data, from the xt domain to the k-$\omega$ domain, and then calculates the power in the k-$\omega$ plane, as represented by a k-$\omega$ plot.

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $$k=\omega/u,$$

where u is the convection velocity (flow velocity). A plot of k-$\omega$ pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 120 is distributed over a range of length scales and hence temporal frequencies.

To calculate the power in the k-$\omega$ plane, as represented by a k-$\omega$ plot (see FIG. 21) of either the signals, the array processor 132 determines the wavelength and so the (spatial) wavenumber k, and also the (temporal) frequency and so the angular frequency $\omega$, of various of the spectral components of the stochastic parameter. There are numerous algorithms available in the public domain to perform the spatial/temporal decomposition of arrays of sensor units 15–18.

The present invention may use temporal and spatial filtering to precondition the signals to effectively filter out the common mode characteristics $P_{common\ mode}$ and other long wavelength (compared to the sensor spacing) characteristics in the pipe 14 by differencing adjacent sensors and retain a substantial portion of the stochastic parameter associated with the flow field and any other short wavelength (compared to the sensor spacing) low frequency stochastic parameters.

Figure 20:
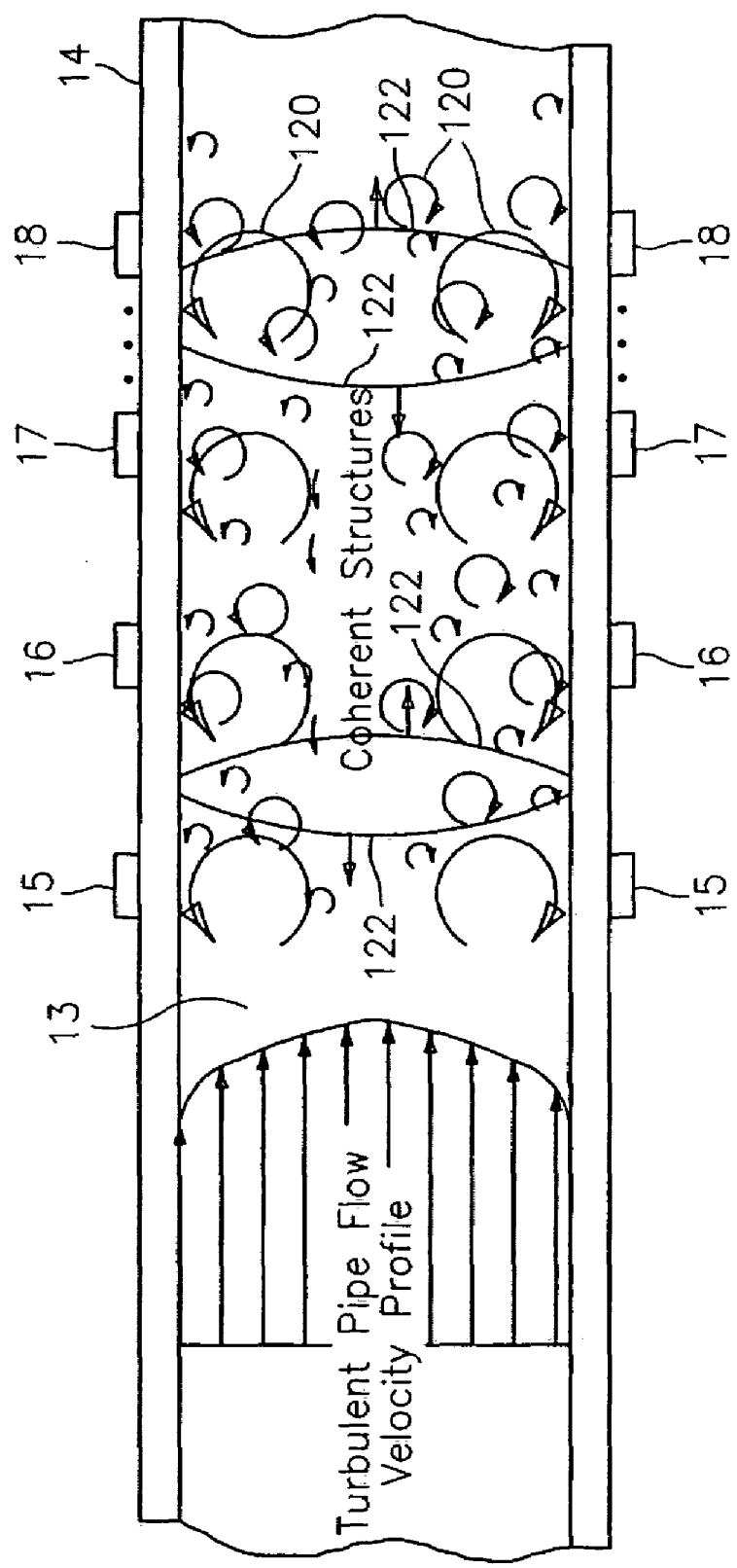
FIG. 20 is a cross-sectional view of a pipe having coherent structures therein, in accordance with the present invention.
Figure 21:
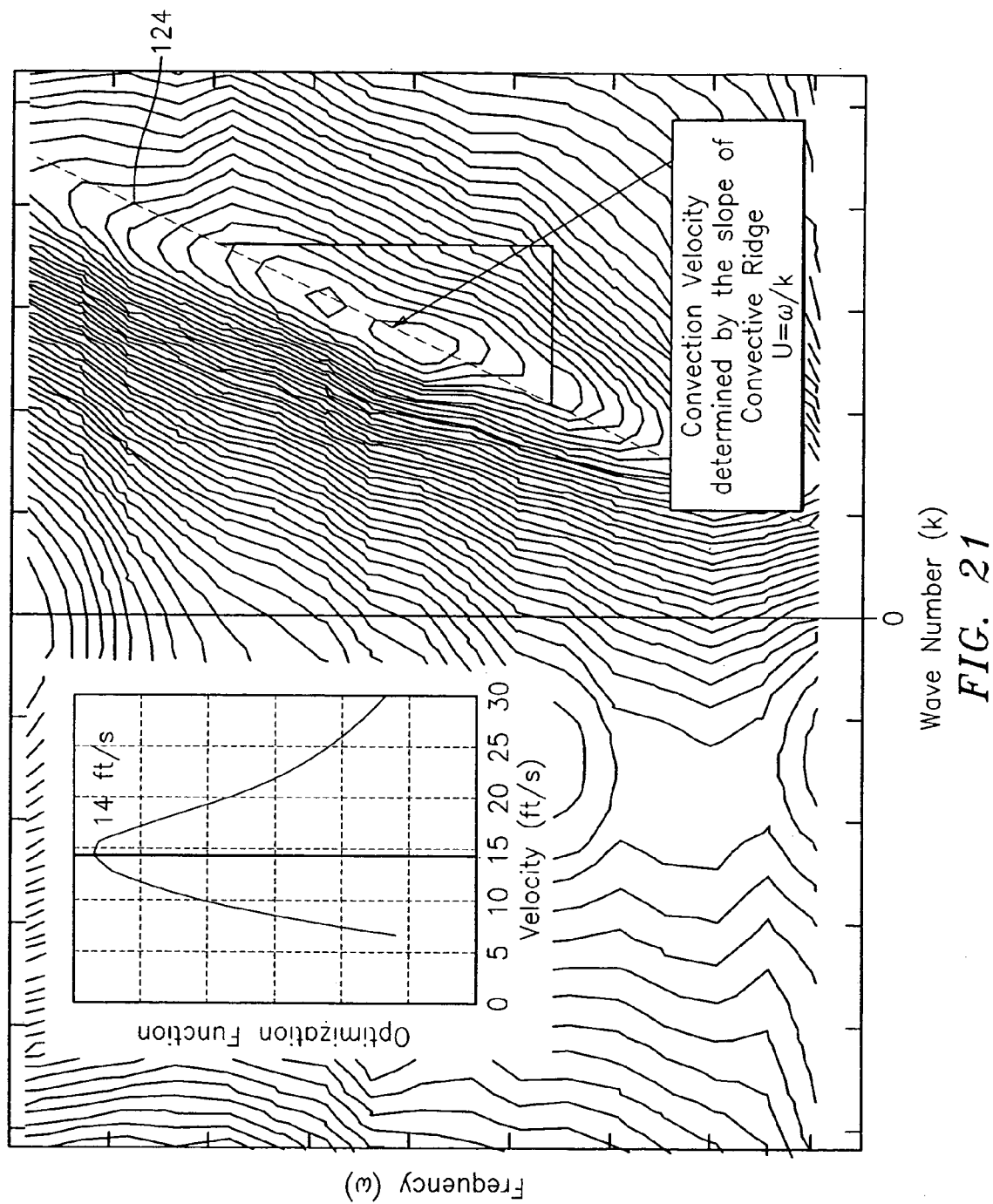
FIG. 21 a kω plot of data processed from an apparatus embodying the present invention that illustrates slope of the convective ridge, and a plot of the optimization function of the convective ridge, in accordance with the present invention.

In the case of suitable turbulent eddies 120 (see FIG. 20) being present, the power in the k-$\omega$ plane shown in a k-$\omega$ plot of FIG. 21 shows a convective ridge 124. The convective ridge represents the concentration of a stochastic parameter that convects with the flow and is a mathematical manifestation of the relationship between the spatial variations and temporal variations described above. Such a plot will indicate a tendency for k-$\omega$ pairs to appear more or less along a line 124 with some slope, the slope indicating the flow velocity.

Once the power in the k-$\omega$ plane is determined, a convective ridge identifier 134 uses one or another feature extraction method to determine the location and orientation (slope) of any convective ridge 124 present in the k-$\omega$ plane. In one embodiment, a so-called slant stacking method is used, a method in which the accumulated frequency of k-$\omega$ pairs in the k-$\omega$ plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information.

The analyzer 136 examines the convective ridge information including the convective ridge orientation (slope). Assuming the straight-line dispersion relation given by $k=\omega/u$, the analyzer 136 determines the flow velocity, Mach number and/or volumetric flow, which are output as parameters 21. The volumetric flow is determined by multiplying the cross-sectional area of the inside of the pipe with the velocity of the process flow.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

Speed of Sound (SOS) Processing

Figure 22:
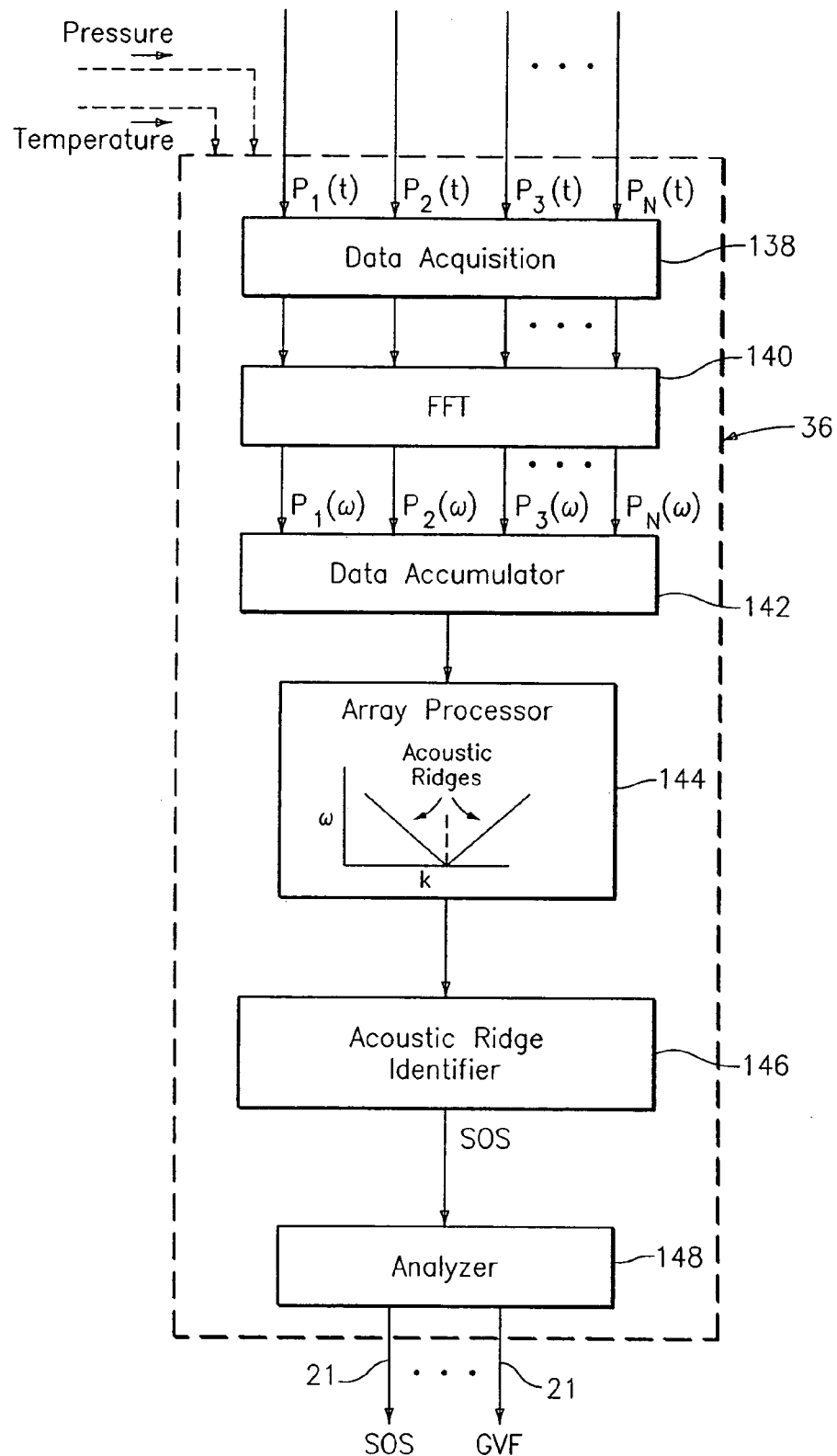
FIG. 22 is a block diagram of a second embodiment of a flow logic used in the apparatus of the present invention.
Figure 23:
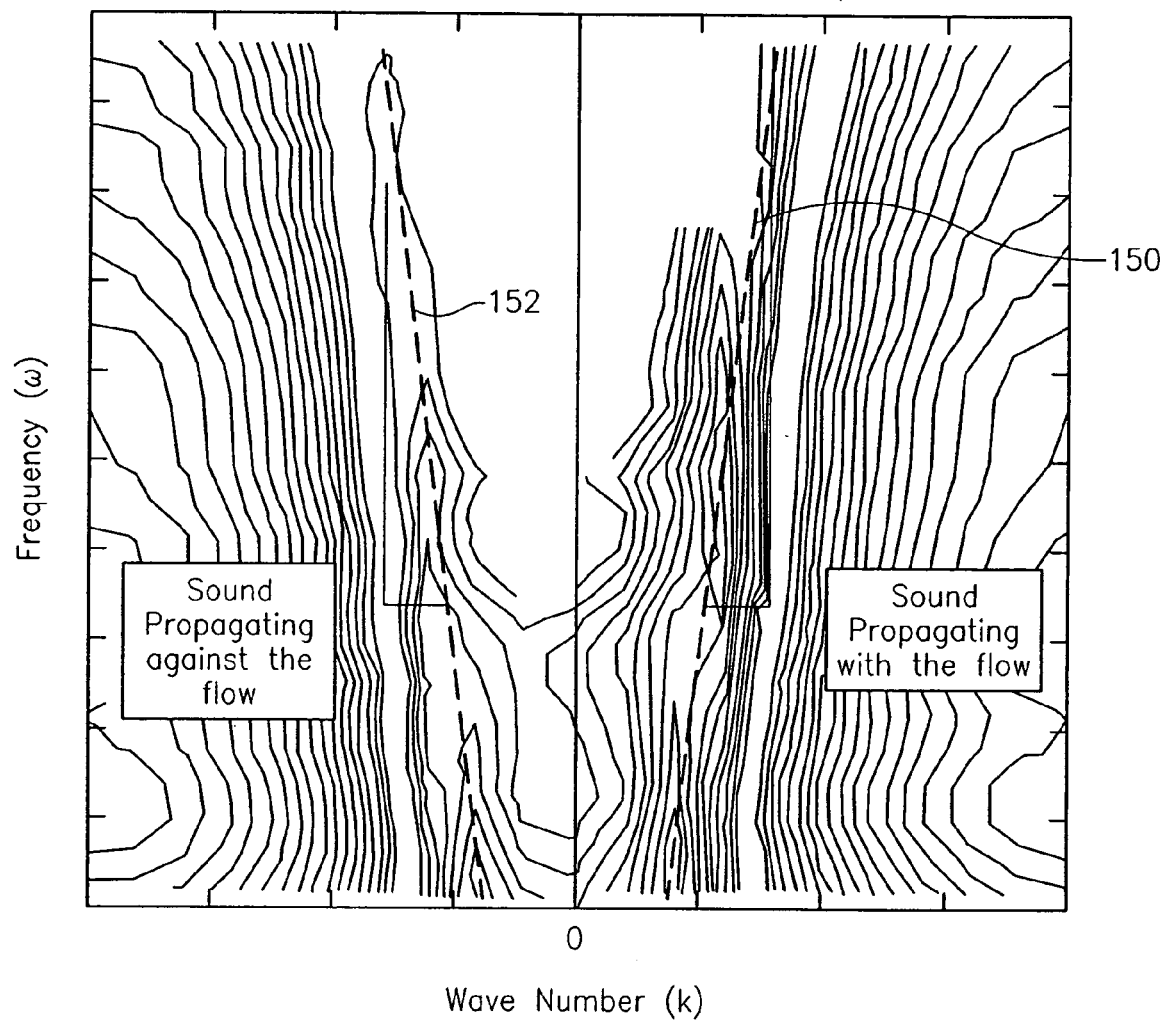
FIG. 23 a kω plot of data processed from an apparatus embodying the present invention that illustrates slope of the acoustic ridges, in accordance with the present invention.

Referring to FIG. 22, another example of flow logic 36 is shown. While the examples of FIG. 22 and FIG. 23 are shown separately, it is contemplated that the flow logic 36 may perform all of the functions described with reference to FIG. 22 and FIG. 23. As previously described, the array of at least two sensors located at two at least two locations $x_1,x_2$ axially along the pipe 14 sense respective stochastic signals propagating between the sensors within the pipe at their respective locations. Each sensor provides a signal indicating an unsteady pressure at the location of each sensor, at each instant in a series of sampling instants. One will appreciate that the sensor array may include more than two pressure sensors distributed at locations $x_1 \ldots x_N$. The sensors provide analog pressure time-varying signals $P_1(t), P_2(t), P_3(t), P_N(t)$ to the flow logic 36. The flow logic 36 processes the signals $P_1(t), P_2(t), P_3(t), P_N(t)$ to first provide output signals indicative of the speed of sound propagating through the fluid (process flow) 13, and subsequently, provide output signals in response to pressure disturbances generated by acoustic waves propagating through the process flow 13, such as velocity, Mach number and volumetric flow rate of the process flow 13.

The flow logic 36 receives the pressure signals from the array of sensors 15–18. A data acquisition unit 138 digitizes pressure signals $P_1(t)$–$P_N(t)$ associated with the acoustic waves 122 propagating through the pipe 14. Similarly to the FFT logic 128 of FIG. 19, an FFT logic 140 calculates the Fourier transform of the digitized time-based input signals $P_1(t)$–$P_N(t)$ and provide complex frequency domain (or frequency based) signals $P_1(\omega), P_2(\omega), P_3(\omega), P_N(\omega)$ indicative of the frequency content of the input signals.

A data accumulator 142 accumulates the frequency signals $P_1(\omega)$–$P_N(\omega)$ over a sampling interval, and provides the data to an array processor 144, which performs a spatial-temporal (two-dimensional) transform of the sensor data, from the $x_t$ domain to the k-$\omega$ domain, and then calculates the power in the k-$\omega$ plane, as represented by a k-$\omega$ plot.

To calculate the power in the k-$\omega$ plane, as represented by a k-$\omega$ plot (see FIG. 23) of either the signals or the differenced signals, the array processor 144 determines the wavelength and so the (spatial) wavenumber k, and also the (temporal) frequency and so the angular frequency $\omega$, of various of the spectral components of the stochastic parameter. There are numerous algorithms available in the public domain to perform the spatial/temporal decomposition of arrays of sensor units 15–18.

In the case of suitable acoustic waves 122 being present in both axial directions, the power in the k-$\omega$ plane shown in a k-$\omega$ plot of FIG. 23 so determined will exhibit a structure that is called an acoustic ridge 150, 152 in both the left and right planes of the plot, wherein one of the acoustic ridges 150 is indicative of the speed of sound traveling in one axial direction and the other acoustic ridge 152 being indicative of the speed of sound traveling in the other axial direction. The acoustic ridges represent the concentration of a stochastic parameter that propagates through the flow and is a mathematical manifestation of the relationship between the spatial variations and temporal variations described above. Such a plot will indicate a tendency for k-$\omega$ pairs to appear more or less along a line 150, 152 with some slope, the slope indicating the speed of sound.

The power in the k-$\omega$ plane so determined is then provided to an acoustic ridge identifier 146, which uses one or another feature extraction method to determine the location and orientation (slope) of any acoustic ridge present in the left and right k-$\omega$ plane. The velocity may be determined by using the slope of one of the two acoustic ridges 150, 152 or averaging the slopes of the acoustic ridges 150, 152.

Finally, information including the acoustic ridge orientation (slope) is used by an analyzer 148 to determine the flow parameters relating to measured speed of sound, such as the consistency or composition of the flow, the density of the flow, the average size of particles in the flow, the air/mass ratio of the flow, gas volume fraction of the flow, the speed of sound propagating through the flow, and/or the percentage of entrained air within the flow.

Similar to the array processor 132 of FIG. 19, the array processor 144 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

One such technique of determining the speed of sound propagating through the process flow 13 is using array processing techniques to define an acoustic ridge in the k-$\omega$ plane as shown in FIG. 23. The slope of the acoustic ridge is indicative of the speed of sound propagating through the process flow 13. The speed of sound (SOS) is determined by applying sonar arraying processing techniques to determine the speed at which the one dimensional acoustic waves propagate past the axial array of unsteady pressure measurements distributed along the pipe 14.

The flow logic 36 of the present embodiment measures the speed of sound (SOS) of one-dimensional sound waves propagating through the process flow 13 to determine the gas volume fraction of the process flow 13. It is known that sound propagates through various mediums at various speeds in such fields as SONAR and RADAR fields. The speed of sound propagating through the pipe 14 and process flow 13 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004; U.S. patent application Ser. No. 09/997,221, filed Nov. 28, 2001, now U.S. Pat. No. 6,587,798; U.S. patent application Ser. No. 10/007,749, filed Nov. 7, 2001, and U.S. patent application Ser. No. 10/762,410, filed Jan. 21, 2004, each of which are incorporated herein by reference.

While the sonar-based flow meter using an array of sensors 15–18 to measure the speed of sound of an acoustic wave propagating through the mixture is shown and described, one will appreciate that any means for measuring the speed of sound of the acoustic wave may used to determine the entrained gas volume fraction of the mixture/fluid or other characteristics of the flow described hereinbefore.

The analyzer 148 of the flow logic 36 provides output parameters 21 indicative of characteristics of the process flow 13 that are related to the measured speed of sound (SOS) propagating through the process flow 13. For example, to determine the gas volume fraction (or phase fraction), the analyzer 148 assumes a nearly isothermal condition for the process flow 13. As such the gas volume fraction or the void fraction is related to the speed of sound by the following quadratic equation:

$$Ax^2+Bx+C=0$$

wherein x is the speed of sound, $A=1+rg/rl*(K_{eff}/P-1)-K_{eff}/P$, $B=K_{eff}/P-2+rg/rl$; $C=1-K_{eff}/rl*a_{meas}^2$); Rg=gas density, rl=liquid density, $K_{eff}$=effective K (modulus of the liquid and pipewall), P=pressure, and $a_{meas}$=measured speed of sound.

Effectively,

Gas Voulume Fraction $(GVF)=(-B+sqrt(B^2-4*A*C))/(2*A)$

Alternatively, the sound speed of a mixture can be related to volumetric phase fraction ($\phi_i$) of the components and the sound speed (a) and densities ($\rho$) of the component through the Wood equation.

$$\frac{1}{\rho_{mix}a_{mix\infty}^2} = \sum_{i=1}^{N}\frac{\phi_i}{\rho_i a_i^2} \text{ where } \rho_{mix} = \sum_{i=1}^{N}\rho_i\phi_i$$

One dimensional compression waves propagating within a process flow 13 contained within a pipe 14 exert an unsteady internal pressure loading on the pipe. The degree to which the pipe displaces as a result of the unsteady pressure loading influences the speed of propagation of the compression wave. The relationship among the infinite domain speed of sound and density of a mixture; the elastic modulus (E), thickness (t), and radius (R) of a vacuum-backed cylindrical conduit; and the effective propagation velocity ($a_{eff}$) for one dimensional compression is given by the following expression:

$$a_{eff} = \frac{1}{\sqrt{\frac{1}{a_{mix\infty}^2} + \rho_{mix}\frac{2R}{Et}}} \quad \text{(eq 1)}$$

Figure 24:
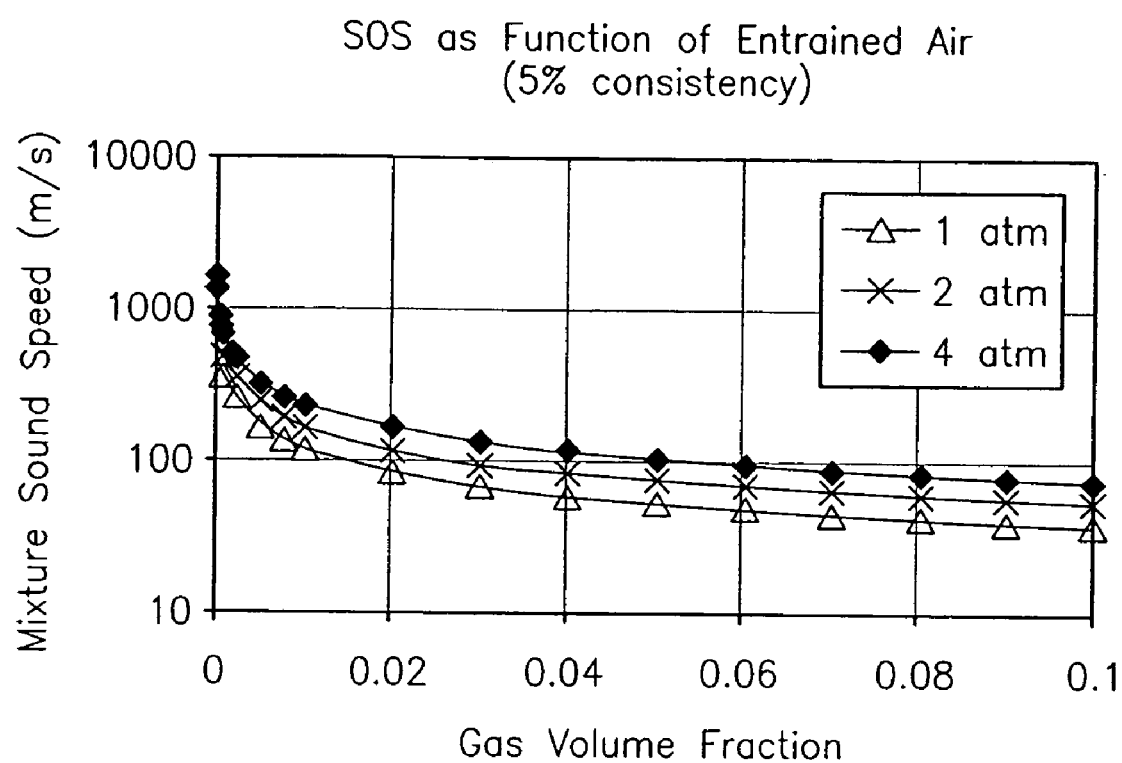
FIG. 24 is a plot of mixture sound speed as a function of gas volume fraction for a 5% consistency slurry over a range of process pressures, in accordance with the present invention.

The mixing rule essentially states that the compressibility of a process flow ($1/(\rho a^2)$) is the volumetrically-weighted average of the compressibilities of the components. For a process flow 13 consisting of a gas/liquid mixture at pressure and temperatures typical of paper and pulp industry, the compressibility of gas phase is orders of magnitudes greater than that of the liquid. Thus, the compressibility of the gas phase and the density of the liquid phase primarily determine mixture sound speed, and as such, it is necessary to have a good estimate of process pressure to interpret mixture sound speed in terms of volumetric fraction of entrained gas. The effect of process pressure on the relationship between sound speed and entrained air volume fraction is shown in FIG. 24.

As described hereinbefore, the flow logic 36 of the present embodiment includes the ability to accurately determine the average particle size of a particle/air or droplet/air mixture within the pipe 14 and the air to particle ratio. Provided there is no appreciable slip between the air and the solid coal particle, the propagation of one dimensional sound wave through multiphase mixtures is influenced by the effective mass and the effective compressibility of the mixture. For an air transport system, the degree to which the no-slip assumption applies is a strong function of particle size and frequency. In the limit of small particles and low frequency, the no-slip assumption is valid. As the size of the particles increases and the frequency of the sound waves increase, the non-slip assumption becomes increasing less valid. For a given average particle size, the increase in slip with frequency causes dispersion, or, in other words, the sound speed of the mixture to change with frequency. With appropriate calibration the dispersive characteristic of a process flow 13 will provide a measurement of the average particle size, as well as, the air to particle ratio (particle/fluid ratio) of the process flow 13.

In accordance with the present invention the dispersive nature of the system utilizes a first principles model of the interaction between the air and particles. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R. L. Gibson, Jr. and M. N. Toksöz), which is incorporated herein by reference. The model allows for slip between the local velocity of the continuous fluid phase and that of the particles.

The following relation can be derived for the dispersive behavior of an idealized fluid particle mixture.

$$a_{mix}(\omega) = a_f\sqrt{\frac{1}{1 + \frac{\varphi_p\rho_p}{\rho_f\left(1+\omega^2\frac{\rho_p^2 v_p^2}{K^2}\right)}}}$$

In the above relation, the fluid SOS, density ($\rho$) and viscosity ($\phi$) are those of the pure phase fluid, $v_p$ is the volume of individual particles and $\phi_p$ is the volumetric phase fraction of the particles in the mixture.

Figure 25:
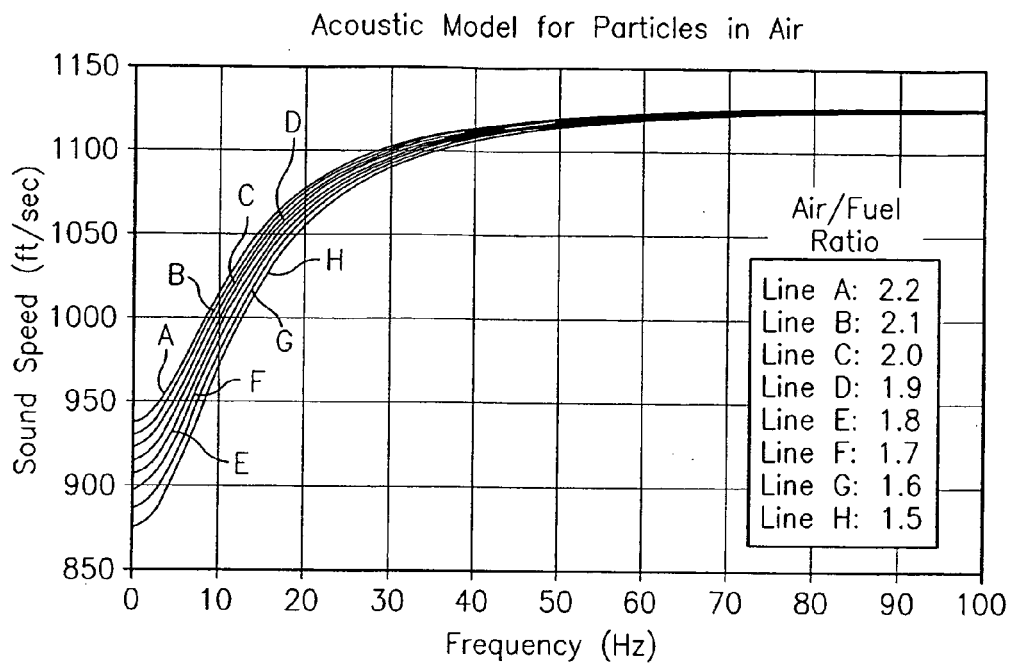
FIG. 25 is a plot of sound speed as a function of frequency for air/particle mixtures with fixed particle size and varying air-to-particle mass ratio in accordance with the present invention.
Figure 26:
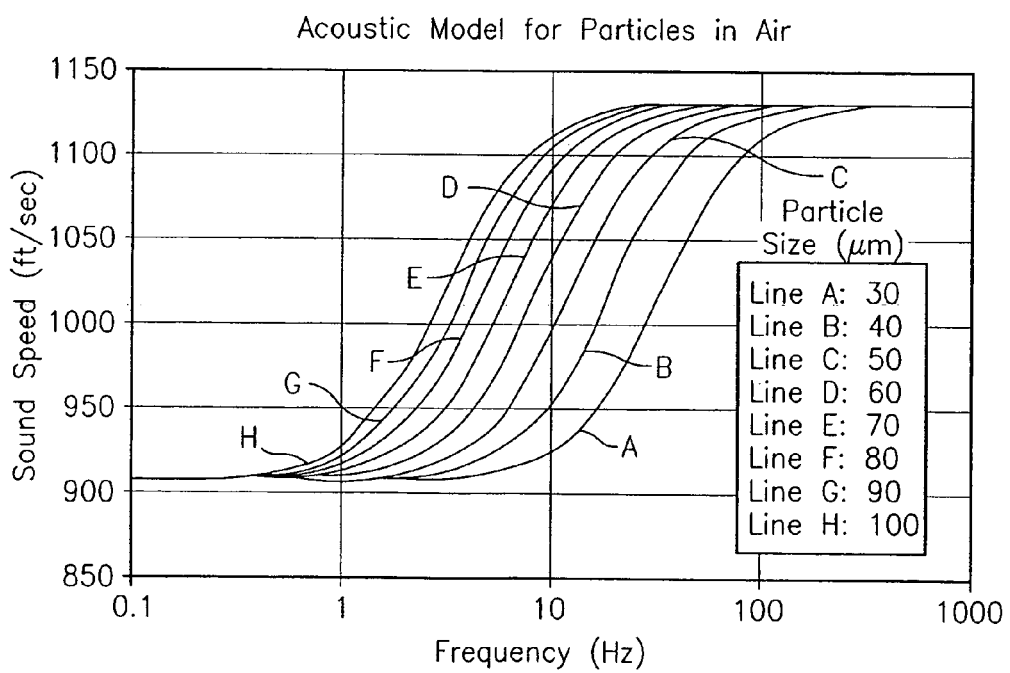
FIG. 26 is a plot of sound speed as a function of frequency for air/particle mixtures with varying particle size where the air-to-particle mass ratio is fixed in accordance with the present invention.

Two parameters of particular interest in steam processes and air-conveyed particles processes are particle size and air-to-fuel mass ratio or steam quality. To this end, it is of interest to examine the dispersive characteristics of the mixture as a function of these two variables. FIG. 25 and FIG. 26 show the dispersive behavior in relations to the speed of sound for coal/air mixtures with parameters typical of those used in pulverized coal deliver systems.

In particular FIG. 25 shows the predicted behavior for nominally 50 μm size coal in air for a range of air-to-fuel ratios. As shown, the effect of air-to-fuel ratio is well defined in the low frequency limit. However, the effect of the air-to-fuel ratio becomes indistinguishable at higher frequencies, approaching the sound speed of the pure air at high frequencies (above ~100 Hz).

Similarly, FIG. 26 shows the predicted behavior for a coal/air mixture with an air-to-fuel ratio of 1.8 with varying particle size. This figure illustrates that particle size has no influence on either the low frequency limit (quasi-steady) sound speed, or on the high frequency limit of the sound speed. However, particle size does have a pronounced effect in the transition region.

FIG. 25 and FIG. 26 illustrate an important aspect of the present invention. Namely, that the dispersive properties of dilute mixtures of particles suspended in a continuous liquid can be broadly classified into three frequency regimes: low frequency range, high frequency range and a transitional frequency range. Although the effect of particle size and air-to-fuel ratio are inter-related, the predominant effect of air-to-fuel ratio is to determine the low frequency limit of the sound speed to be measured and the predominate effect of particle size is to determine the frequency range of the transitional regions. As particle size increases, the frequency at which the dispersive properties appear decreases. For typical pulverized coal applications, this transitional region begins at fairly low frequencies, ~2 Hz for 50 μm size particles.

Given the difficulties measuring sufficiently low frequencies to apply the quasi-steady model and recognizing that the high frequency sound speed contains no direct information on either particle size or air-to-fuel ratio, it becomes apparent that the dispersive characteristics of the coal/air mixture should be utilized to determine particle size and air-to-fuel ratio based on speed of sound measurements.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

While FIG. 19 and FIG. 22 depict two different embodiments of the flow logic 36 to measure various parameters of the flow process, the present invention contemplates that the functions of these two embodiments may be performed by a single flow logic 36.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. A sensor head for characterizing unsteady pressures in a fluid flowing within a pipe, the sensor head comprising:
   a first support structure; and
   a first array of transducers having at least two transducers attached to the first support structure at a desired spacing, each transducer senses a displacement between an external surface of the pipe and the first support structure at each respective axial location of the pipe, and provide respective signals indicative of unsteady pressures within the fluid at each respective axial location of the pipe in response to the respective displacements.

2. The sensor bead of claim 1, wherein the transducers are disposed between the first support structure and the external surface of the pipe.

3. The sensor head of claim 1, wherein the first support structure is secured to the pipe with at least one strap.

4. The sensor head of claim 1, wherein the first support structure includes a handle for manipulating the sensor head into contact with the pipe.

5. The sensor head of claim 4, wherein each of the transducers in the first array of transducers includes:
   a transducer element attached to the first support structure; and
   a standoff probe attached to the transducer element, the standoff probe having a pipe contacting tip on its distal end.

6. The sensor bead of claim 5, wherein an overall length of the standoff probe is selected to protect the transducer element from a potentially harmful condition proximate the pipe.

7. The sensor bead of claim 5, wherein the pipe contacting tip is shaped to enable penetration of a material surrounding the pipe to come into contact with the pipe.

8. The sensor head of claim 4, wherein the handle extends from the first support structure generally perpendicular to a longitudinal axis of the first array of sensors.

9. The sensor head of claim 1, wherein the first support structure includes a strap disposed around the pipe and at least one transducer.

10. The sensor head of claim 9, wherein the strap is anchored to the pipe.

11. The sensor head of claim 9, wherein the strap is disposed around all of the transducers in the first array of transducers.

12. The sensor head of claim 1, further comprising:
   a second array of transducers, each being associated with a corresponding one of the transducers in the first array of transducers at a common axial position of the pipe, the associated transducers in the first and second arrays of transducers provide signals indicative of unsteady pressures within the pipe at the common axial position.

13. The sensor head of claim 12, wherein the signals output by the associated transducers in the first and second arrays of transducers are summed to provide a summed signal indicative of unsteady pressures within the pipe at the common axial position.

14. The sensor head of claim 12, wherein the associated sensors of the first array of transducers and the second array of transducers are diametrically opposed.

15. The sensor head of claim 1, further comprising:
   a second support structure; and
   a second ray of transducers having at least two transducers attached to the second support structure at a desired spacing, each transducer of the second array senses a displacement between an external surface of the pipe and the second support structure at each respective axial location of the pipe, and provide respective signals indicative of unsteady pressures within the fluid at each respective axial location of the pipe in response to the respective displacements;
   wherein each of the transducers in the second array of transducers is associated with a corresponding one of the transducers in the first array of transducers at a common axial location of the pipe, the associated transducers in the first and second arrays of transducers provide signals indicative of unsteady pressures within the pipe at the common axial location.

16. The sensor head of claim 15, wherein the first and second support structures are secured to the pipe wit at least one strap.

17. The sensor head of claim 15, wherein the signals output by the associated transducers are summed to provide a summed signal indicative of unsteady pressures within the pipe at the common axial location.

18. The sensor head of claim 15, wherein the associated sensors of the first array of transducers and the second array of transducers are diametrically opposed.

19. The sensor head of claim 1, wherein each transducer in the first array of transducers includes a transducer element selected from one or more of: piezoelectric devices, optical devices, capacitive devices, resistive devices, accelerometers, velocity measuring devices, displacement measuring devices, inductance and reluctance measuring devices, and magnetostrictive devices.

20. The sensor head of claim 1, wherein each of the transducers includes an accelerometer.

21. The sensor head of claim 1, wherein the first support structure is substantially rigid.

22. The sensor head of claim 1, wherein the transducers sense the displacement between the first support structure and the external surface of the pipe.

23. The sensor head of claim 1, wherein the sensor head is handheld.

24. The sensor head of claim 1, wherein the first array of transducers includes 3, 4, 5, 6, 7, 8, 9, 10, 11, 12, 13, 14, 15, 16, 17, 18, 19, 20, 21, 22, 23 or 24 transducers.

25. An apparatus comprising:
   a sensor head for characterizing unsteady pressures in a fluid flowing within a pipe, the sensor head comprising:
   a first support structure, and a first any of transducers having at least two transducers attached to the first support structure at a desired spacing, each transducer senses a displacement between an external surface of the pipe and the first support structure at each respective axial location of the pine and provide respective signals indicative of unsteady pressures within the fluid at each respective axial location of the pipe in response to the respective displacements; and a signal processor that provides an output signal indicative of at least one parameter of the fluid determined from the signals from the first array of transducers.

26. The apparatus of claim 25, wherein the array of transducers is secured to the pipe with at least one strap.

27. The apparatus of claim 26, wherein each transducer in the first array of transducers includes:
a transducer element attached to the first support structure; and
a standoff probe attached to the transducer element, the standoff probe having a pipe contacting tip on its distal end.

28. The apparatus of claim 27, wherein an overall length of the standoff probe is selected to protect the transducer element from a potentially harmful condition proximate the pipe.

29. The apparatus of claim 28, wherein the pipe contacting tip is shaped to enable penetration of a material surrounding the pipe to come into contact with the pipe.

30. The apparatus of claim 25, wherein the first support structure includes a handle for manipulating the sensor head into contact with the pipe.

31. The apparatus of claim 30, wherein the first array of transducers includes 3, 4, 5, 6, 7, 8, 9, 10, 11, 12, 13, 14, 15, 16, 17, 18, 19, 20, 21, 22, 23 or 24 transducers.

32. The apparatus of claim 25, wherein the first support structure includes a strap disposed around the pipe and at least one transducer.

33. The apparatus of claim 32, wherein the strap is anchored to the pipe.

34. The apparatus of claim 32, wherein the strap is disposed around all of the transducers in the first array of transducers.

35. The apparatus of claim 25, further comprising:
a second array of transducers, each being associated with a corresponding one of the transducers in the first array of transducers at a common axial position of the pipe, the associated transducers in the first and second arrays of transducers provide signals indicative of unsteady pressures within the pipe at the common axial position, and the signal processor determines the at least one parameter using the signals from the first and second arrays of transducers.

36. The apparatus of claim 35, wherein the signals output by the associated transducers in the first and second arrays of transducers are summed to provide a summed signal indicative of unsteady pressures within the pipe at the common axial position.

37. The apparatus of claim 35, wherein the associated sensors of the first array of transducers and the second array of transducers are diametrically opposed.

38. The apparatus of claim 25, further comprising:
a second support structure; and
a second array of transducers having at least two transducers attached to the second support structure at a desired spacing, each transducer of the second array senses a displacement between an external surface of the pipe and the second support structure at each respective axial location of the pipe, and provide respective signals indicative of unsteady pressures within the fluid at each respective axial location of the pipe in response to the respective displacements;
wherein each of the transducers in the second array of transducers is associated with a corresponding one of the transducers in the first may of transducers at a common axial location of the pipe, the associated transducers in the first and second arrays of transducers provide signals indicative of unsteady pressures within the pipe at the common axial location, and the signal processor determines the at least one parameter using the signals from the first and second arrays of transducers.

39. The apparatus of claim 38, wherein the first and second support structures are secured to the pipe wit at least one strap.

40. The apparatus of claim 38, wherein the signals output by the associated transducers are summed to provide a summed signal indicative of unsteady pressures within the pipe at the common axial location.

41. The apparatus of claim 38, wherein the associated sensors of the first array of transducers and the second array of transducers are diametrically opposed.

42. The apparatus of claim 25, wherein each transducer in the first array of transducers includes a transducer element selected from one or more of: piezoelectric devices, optical devices, capacitive devices, resistive devices, accelerometers, velocity measuring devices, displacement measuring devices, inductance and reluctance measuring devices, and magnetostrictive devices.

43. The apparatus of claim 25, wherein each of the transducers includes an accelerometer.

44. The apparatus claim 25, wherein the transducers are disposed between the first support structure and the external surface of the pipe.

45. The apparatus of claim 25, wherein the first support structure is substantially rigid.

46. The apparatus of claim 25, wherein the transducers sense the displacement between the first support structure and the external surface of the pipe.

47. The apparatus of claim 25, wherein the sensor head is handheld.

48. The apparatus of claim 25, wherein the at least one parameter of the fluid flow is at least one of volumetric flow rate, mass flow rate, density, composition, entrained air, consistency, particle size, flow velocity, mach number, and speed of sound propagating through the fluid.

* * * * *